(12) United States Patent
Brodie et al.

(10) Patent No.: US 8,365,552 B2
(45) Date of Patent: Feb. 5, 2013

(54) EVAPORATOR UNIT HAVING TANK PROVIDED WITH EJECTOR NOZZLE

(75) Inventors: Bradley Brodie, Nagoya (JP); Yoshiaki Takano, Kosai (JP); Shigeki Ito, Okazaki (JP); Mika Gocho, Obu (JP); Haruyuki Nishijima, Obu (JP); Tomohiko Nakamura, Obu (JP)

(73) Assignee: Denso Corporation, Kariya (JP)

( * ) Notice: Subject to any disclaimer, the term of this patent is extended or adjusted under 35 U.S.C. 154(b) by 1140 days.

(21) Appl. No.: 12/288,787

(22) Filed: Oct. 23, 2008

(65) Prior Publication Data

US 2009/0107171 A1    Apr. 30, 2009

(30) Foreign Application Priority Data

Oct. 24, 2007 (JP) ................................ 2007-276241
Jul. 28, 2008 (JP) ................................ 2008-193153

(51) Int. Cl.
F25B 1/06    (2006.01)
F25B 39/02   (2006.01)

(52) U.S. Cl. .......................................... 62/500; 62/525
(58) Field of Classification Search .................... 62/500, 62/525

See application file for complete search history.

(56) References Cited

U.S. PATENT DOCUMENTS

| | | | | |
|---|---|---|---|---|
| 3,404,542 | A * | 10/1968 | Fineblum | 62/324.6 |
| 2003/0213264 | A1* | 11/2003 | Ogata et al. | 62/500 |
| 2004/0159121 | A1* | 8/2004 | Horiuchi et al. | 62/526 |
| 2004/0244360 | A1* | 12/2004 | McMullen et al. | 60/257 |
| 2007/0163294 | A1 | 7/2007 | Aung et al. | |
| 2007/0169511 | A1 | 7/2007 | Ishizaka et al. | |
| 2008/0264097 | A1 | 10/2008 | Ishizaka et al. | |

FOREIGN PATENT DOCUMENTS

| | | |
|---|---|---|
| JP | 06-026718 | 2/1994 |
| JP | 2007-057177 | 3/2007 |
| JP | 2007-192465 | 8/2007 |
| JP | 2007-192504 | 8/2007 |

OTHER PUBLICATIONS

Office action dated Sep. 29, 2009 in corresponding Japanese Application No. 2008-193153.
Office action dated Sep. 6, 2011 in corresponding Japanese Application No. 2009-266112.

* cited by examiner

*Primary Examiner* — Judy Swann
*Assistant Examiner* — Filip Zec
(74) *Attorney, Agent, or Firm* — Harness, Dickey & Pierce, PLC

(57) ABSTRACT

In an evaporator unit for a refrigerant cycle device, an evaporator is connected to an ejector to evaporate refrigerant to be drawn into a refrigerant suction port of the ejector or the refrigerant flowing out of the outlet of the ejector. The evaporator includes a plurality of tubes in which the refrigerant flows, and a tank configured to distribute the refrigerant into the tubes or to collect the refrigerant from the tubes. The ejector is located in the tank, and the nozzle portion is brazed to the tank to be fixed into the tank. The tank may be a header tank directly connected to the tubes or may be a separate tank separated from the header tank.

24 Claims, 11 Drawing Sheets

EVAPORATOR UNIT HAVING TANK PROVIDED WITH EJECTOR NOZZLE

CROSS REFERENCE TO RELATED APPLICATION

This application is based on Japanese Patent Applications No. 2007-276241 filed on Oct. 24, 2007, and No. 2008-193153 filed on Jul. 28, 2008, the contents of which are incorporated herein by reference in its entirety.

FIELD OF THE INVENTION

The present invention relates to an evaporator unit for a refrigerant cycle device with an ejector.

BACKGROUND OF THE INVENTION

JP-A-2007-192465 (corresponding to US 2007/0163294 A1) proposes an evaporator unit for a refrigerant cycle device with an ejector. In the evaporator unit, the ejector having a refrigerant decompressing function and a refrigerant circulating function is located inside a tank of an evaporator so that the ejector and the evaporator are integrated. Thus, the ejector and the evaporator can be mounted as an integrated unit, thereby improving a mounting performance of the refrigerant cycle device with the ejector.

In the evaporator unit, after an evaporator body is integrally brazed, the ejector is assembled to the evaporator body. Therefore, the productivity of the evaporator unit may be deteriorated, and the manufacturing cost of the evaporator unit may be increased. Furthermore, the ejector is difficult to be used for evaporators with different widths (i.e., different dimensions in a tank longitudinal direction), thereby reducing the compatibility of the ejector relative to the evaporators with different widths.

SUMMARY OF THE INVENTION

In view of the foregoing problems, it is an object of the present invention to improve the productivity of an evaporator unit while reducing the manufacturing cost of the evaporator unit.

It is another object of the present invention to improve the compatibility of an ejector relative to evaporators with different widths.

According to an aspect of the present invention, an evaporator unit includes an elector and an evaporator. The ejector has a nozzle portion configured to decompress refrigerant, and a refrigerant suction port from which the refrigerant is drawn by a high-speed refrigerant flow jetted from the nozzle portion. The refrigerant jetted from the nozzle portion and the refrigerant drawn from the refrigerant suction port are mixed and discharged from an outlet of the ejector. The evaporator is connected to the ejector to evaporate the refrigerant to be drawn into the refrigerant suction port or the refrigerant flowing out of the outlet of the ejector. Furthermore, the evaporator includes a plurality of tubes in which the refrigerant flows, and a tank configured to distribute the refrigerant into the tubes or to collect the refrigerant from the tubes. In addition, the ejector is located in the tank, and the nozzle portion is brazed to the tank to be fixed into the tank. Accordingly, the assemble work of the evaporator unit can be made simple as compared with a case where the nozzle portion is assembled to the evaporator after the evaporator is brazed. Therefore, the productivity of the evaporator unit can be improved while the manufacturing cost of the evaporator unit can be reduced.

For example, a part of the nozzle portion may be brazed to the tank. As an example, the nozzle portion may have substantially a cylindrical shape having an outer peripheral surface. In this case, the nozzle portion may be brazed to the tank at least on a part of the outer peripheral surface.

The evaporator unit may be provided with a suction refrigerant passage, provided at a radial outside of the nozzle portion, through which the refrigerant drawn from the refrigerant suction port flows. In this case, the outer peripheral surface of the nozzle portion is brazed to the tank at a portion except for the suction refrigerant passage.

At least one of the nozzle portion and the tank may be formed by a clad material on which a brazing material is covered. Alternatively, the nozzle portion may be provided with a temporal fixing portion configured to be temporally fixed to the tank.

The nozzle portion may be partially brazed to the tank at plural positions except for a refrigerant inlet and a refrigerant outlet of the nozzle portion.

The evaporator unit may be further provided with a nozzle support portion located in the tank and protruding from an inner wall surface of the tank to the outer peripheral surface of the nozzle portion to support the nozzle portion. In this case, the nozzle portion and the nozzle support portion are brazed to be fixed to each other, and at least one of the plural positions is a brazing portion between the nozzle portion and the nozzle support portion.

In the evaporator unit, the tank may be configured to extend in a tank longitudinal direction and to have therein first and second spaces partitioned from each other in the tank longitudinal direction, such that the first space of the tank is configured to distribute the refrigerant into the tubes, and the second space of the tank is configured to collect the refrigerant from the tubes. In this case, the refrigerant inlet of the nozzle portion is located in the first space, and the refrigerant outlet of the nozzle portion is located in the second space. Furthermore, the evaporator unit includes a refrigerant inlet provided at an end portion of the tank on a side of the first space in the tank longitudinal direction, and a nozzle inlet pipe located in the first space of the tank. The refrigerant inlet of the nozzle portion communicates with the refrigerant inlet of the end portion of the tank through the nozzle inlet pipe. Furthermore, one of the nozzle portion and the nozzle inlet pipe can be inserted into the other one of the nozzle portion and the nozzle inlet pipe. Accordingly, the compatibility of an ejector relative to evaporators with different widths can be improved.

As an example, the nozzle portion is inserted into the nozzle inlet pipe to have an insertion portion. In this case, the insertion portion of the nozzle portion is brazed to an end portion of the nozzle inlet pipe.

According to another aspect of the present invention, an evaporator unit includes an ejector and an evaporator. The ejector has a nozzle portion configured to decompress refrigerant, and a refrigerant suction port from which refrigerant is drawn by a high-speed refrigerant flow jetted from the nozzle portion. The refrigerant jetted from the nozzle portion and the refrigerant drawn from the refrigerant suction port are mixed in the ejector and discharged from an outlet of the ejector. The evaporator is connected to the ejector to evaporate the refrigerant to be drawn into the refrigerant suction port or the refrigerant flowing out of the outlet of the ejector. Furthermore, the evaporator has a plurality of tubes in which the refrigerant flows, and a tank extending in a tank longitudinal direction that is in parallel with an arrangement direction of the tubes to distribute the refrigerant into the tubes or to collect the refrigerant from the tubes. In the evaporator unit, the tank is configured to have therein first and second spaces partitioned from each other in the tank longitudinal direction, the first space of the tank is configured to distribute the refrigerant into the tubes, the second space of the tank is configured to collect the refrigerant from the tubes, the nozzle portion has a refrigerant inlet positioned in the first space and a refrigerant outlet positioned in the second space, the tank has a refrigerant inlet on a side of the first space in the tank longitudinal direction, and the refrigerant inlet of the nozzle portion communicates with the refrigerant inlet of the tank via a nozzle inlet pipe located in the first space of the tank. Accordingly, by suitably adjusting or setting the length of the nozzle inlet pipe, the ejector can be used for various links of evaporators having different widths in the tank longitudinal direction. Thus, the compatibility of the ejector relative to evaporators with different widths can be improved.

For example, one of the nozzle portion and the nozzle inlet pipe may be inserted into the other one of the nozzle portion and the nozzle inlet pipe. In this case, the insertion length between the nozzle portion and the nozzle inlet pipe can be suitably adjusted.

The nozzle inlet pipe may have a hole from which a part of the refrigerant flowing into the nozzle inlet pipe from the refrigerant inlet of the tank flows into the first space. Alternatively, a plurality of the holes may be provided in the nozzle inlet pipe in the tank longitudinal direction. Generally, the hole is provided to configure a throttle in which the refrigerant is decompressed.

In the evaporator unit according to the above aspects of the present invention, the refrigerant suction port may be provided along an entire outer periphery of the nozzle portion in a circumferential direction.

According to another aspect of the present invention, an evaporator unit includes an ejector and an evaporator. The ejector has a nozzle portion configured to decompress refrigerant, and a refrigerant suction port from which refrigerant is drawn by a high-speed refrigerant flow jetted from the nozzle portion. The refrigerant jetted from the nozzle portion and the refrigerant drawn from the refrigerant suction port are mixed in the ejector and discharged from an outlet of the ejector. The evaporator is connected to the ejector to evaporate the refrigerant to be drawn into the refrigerant suction port or the refrigerant flowing out of the outlet of the ejector. Furthermore, the evaporator includes a plurality of tubes in which the refrigerant flows, and a header tank configured to distribute the refrigerant into the tubes or to collect the refrigerant from the tubes. In the evaporator unit, a separate tank is located to be partitioned from the header tank while contacting the header tank. In addition, the ejector is located in the separate tank outside the header tank, and the nozzle portion is brazed to the separate tank to be fixed into the separate tank. Accordingly, the productivity of the evaporator unit can be improved while the manufacturing cost of the evaporator unit can be reduced.

For example, the ejector may be configured in the separate tank to define a suction refrigerant passage at a radial outside of the nozzle portion between the nozzle portion and the separate tank, and the suction refrigerant passage is made to communicate with the refrigerant suction port such that the refrigerant drawn from the refrigerant suction port flows through the suction refrigerant passage. In this case, an outer peripheral surface of the nozzle portion is brazed to the separate tank at a portion except for the suction refrigerant passage.

BRIEF DESCRIPTION OF THE DRAWINGS

Additional objects and advantages of the present invention will be more readily apparent from the following detailed description of embodiments when taken together with the accompanying drawings. In the drawings.

DETAILED DESCRIPTION OF THE PREFERRED EMBODIMENTS

First Embodiment

A first embodiment of the present invention and modifications of the first embodiment will be described below with reference to FIGS. 1 to 5. In the present embodiment, an evaporator unit for an ejector refrigerant cycle device and an ejector refrigerant cycle device using the evaporator unit will be now described. For example, the evaporator unit is an ejector-equipped evaporator unit for a refrigerant cycle device.

The evaporator unit is connected to other components of the refrigerant cycle device, including a condenser (refrigerant cooler), a compressor, and the like, via piping. The evaporator unit of the present embodiment is used for application to an indoor equipment (i.e., evaporator) for cooling air. However, the evaporator unit may be used as an outdoor equipment in other examples.

Figure 1:
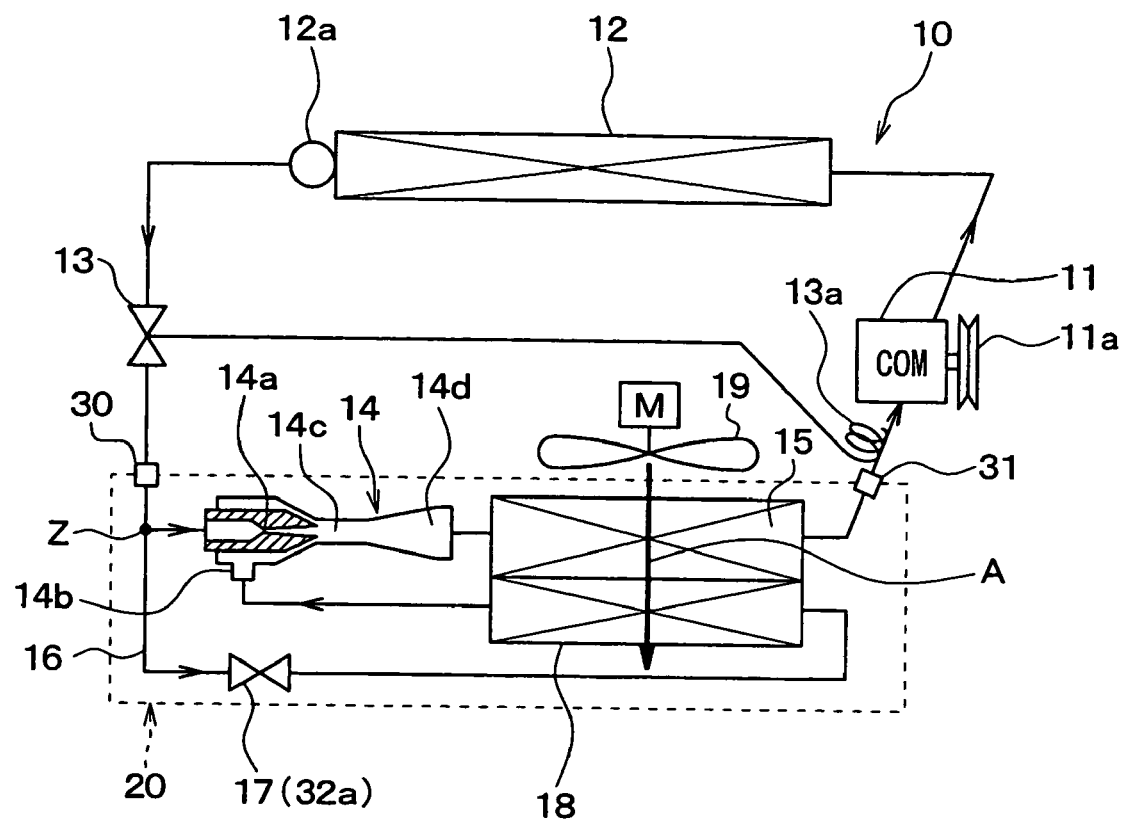
FIG. 1 is a schematic diagram showing a refrigerant cycle device with an ejector, according to a first embodiment of the present invention.

In an ejector refrigerant cycle device 10 shown in FIG. 1, a compressor 11 for drawing and compressing refrigerant is driven by an engine for vehicle traveling (not shown) via an electromagnetic clutch 11a, a belt, or the like. The ejector refrigerant cycle device 10 is a refrigerant cycle device with an ejector.

As the compressor 11, may be used either a variable displacement compressor which can adjust a refrigerant discharge capability by a change in discharge capacity, or a fixed displacement compressor which can adjust a refrigerant discharge capability by changing an operating ratio of the compressor through engagement and disengagement of an electromagnetic clutch 11a. If an electric compressor is used as the compressor 11, the refrigerant discharge capability of the compressor 11 can be adjusted or regulated by adjustment of the number of revolutions of an electric motor.

A refrigerant radiator 12 is disposed on a refrigerant discharge side of the compressor 11. The radiator 12 exchanges heat between the high-pressure refrigerant discharged from the compressor 11 and outside air (i.e., air outside a compartment of a vehicle) blown by a cooling fan (not shown) thereby to cool the high-pressure refrigerant.

As the refrigerant for the ejector refrigerant cycle device 10 in the present embodiment, is used a refrigerant whose high pressure does not exceed a critical pressure, such as a flon-based refrigerant, or a HC-based refrigerant, so as to form a vapor-compression subcritical cycle. Thus, the radiator 12 serves as a condenser for cooling and condensing the refrigerant in this embodiment.

A liquid receiver 12a is provided at a refrigerant outlet side of the radiator 12. The liquid receiver 12a has an elongated tank-like shape, as is known generally, and constitutes a vapor-liquid separator for separating the refrigerant into vapor and liquid phases to store therein an excessive liquid refrigerant of the refrigerant cycle. At a refrigerant outlet of the liquid receiver 12a, the liquid refrigerant is derived from the lower part of the interior in the tank-like shape. In the present embodiment, the liquid receiver 12a is integrally formed with the radiator 12.

The radiator 12 may have a known structure which includes a first heat exchanger for condensation positioned on the upstream side of a refrigerant flow, the liquid receiver 12a for allowing the refrigerant introduced from the first heat exchanger for condensation and for separating the refrigerant into vapor and liquid phases, and a second heat exchanger for supercooling the saturated liquid refrigerant from the liquid receiver 12a.

A thermal expansion valve 13 is disposed on an outlet side of the liquid receiver 12a. The thermal expansion valve 13 is a decompression unit for decompressing the liquid refrigerant flowing from the liquid receiver 12a, and includes a temperature sensing part 13a disposed in a refrigerant suction passage of the compressor 11.

The thermal expansion valve 13 detects a degree of superheat of the refrigerant at the compressor suction side based on the temperature and pressure of the suction side refrigerant of the compressor 11, and adjusts an opening degree of the valve (refrigerant flow rate) such that the superheat degree of the refrigerant on the compressor suction side becomes a predetermined value which is preset, as is known generally. Therefore, the thermal expansion valve 13 adjusts a refrigerant flow amount such that the superheat degree of the refrigerant on the compressor suction side becomes the predetermined value.

An ejector 14 is disposed at a refrigerant outlet side of the thermal expansion valve 13. The ejector 14 is decompression means for decompressing the refrigerant as well as refrigerant circulating means (kinetic vacuum pump) for circulating the refrigerant by a suction effect (entrainment effect) of the refrigerant flow ejected at high speed.

The ejector 14 includes a nozzle portion 14a for further decompressing and expanding the refrigerant (the middle-pressure refrigerant from the expansion valve) by restricting a path area of the refrigerant having passed through the expansion valve 13 to a small level. A refrigerant suction port 14b is provided in the ejector 14 in the same space as a refrigerant jet port of the nozzle portion 14a to draw the vapor-phase refrigerant from a second evaporator 18 as described later.

A mixing portion 14c is provided on a downstream side of the refrigerant flow of the nozzle portion 14a and the refrigerant suction port 14b, for mixing a high-speed refrigerant flow jetted from the nozzle portion 14a and the refrigerant drawn from the refrigerant suction port 14b.

A diffuser 14d serving as a pressure-increasing portion is provided on a downstream side of the refrigerant flow of the mixing portion 14c in the ejector 14. The diffuser 14d is formed in such a manner that a path area of the refrigerant is generally increased toward downstream from the mixing portion 14c. The diffuser 14d serves to increase the refrigerant pressure by decelerating the refrigerant flow, that is, to convert the speed energy of the refrigerant into the pressure energy.

A first evaporator 15 is connected to an outlet side of the diffuser 14d of the ejector 14. A refrigerant outlet side of the first evaporator 15 is connected to a refrigerant suction side of the compressor 11.

On the other hand, a refrigerant branch passage 16 is provided to be branched from an inlet side of the nozzle portion 14a of the ejector 14. That is, the refrigerant branch passage 16 is branched at a position between the refrigerant outlet of the thermal expansion valve 13 and the refrigerant inlet of the nozzle portion 14a of the ejector 14. The downstream side of the refrigerant branch passage 16 is connected to the refrigerant suction port 14b of the ejector 14. A point Z of FIG. 1 indicates a branch portion of the refrigerant branch passage 16.

In the refrigerant branch passage 16, a throttle 17 is disposed to decompress the refrigerant passing therethrough. On the refrigerant flow downstream side away from the throttle 17 in the refrigerant branch passage 16, the second evaporator 18 is disposed. The throttle 17 serves as a decompression unit which decompresses the refrigerant while performing a function of adjusting a refrigerant flow amount into the second evaporator 18. More specifically, the throttle 17 can be constructed with a fixed throttle, such as a capillary tube, or an orifice.

In the first embodiment, the two evaporators 15 and 18 are incorporated into an integrated structure with an arrangement as described later. The two evaporators 15 and 18 are accommodated in an air conditioning case not shown, and the air (air to be cooled) is blown by a common electric blower 19 through an air passage formed in the air conditioning case in the direction of an arrow "A", so that the blown air is cooled by the two evaporators 15 and 18.

The cooled air by the two evaporators 15 and 18 is fed to a common space to be cooled (not shown). This causes the two evaporators 15 and 18 to cool the common space to be cooled. Among these two evaporators 15 and 18, the first evaporator 15 connected to a main flow path on the downstream side of the ejector 14 is disposed on the upstream side (upwind side) of the air flow A, while the second evaporator 18 connected to the refrigerant suction port 14b of the ejector 14 is disposed on the downstream side (downwind side) of the air flow A.

When the ejector refrigerant cycle device 10 of the present embodiment is used as a refrigeration cycle for a vehicle air conditioner, the space within a passenger compartment of the vehicle is the space to be cooled. When the ejector refrigerant cycle device 10 of the present embodiment is used for a refrigeration cycle for a freezer car, the space within the freezer and refrigerator of the freezer car is the space to be cooled.

Figure 2:
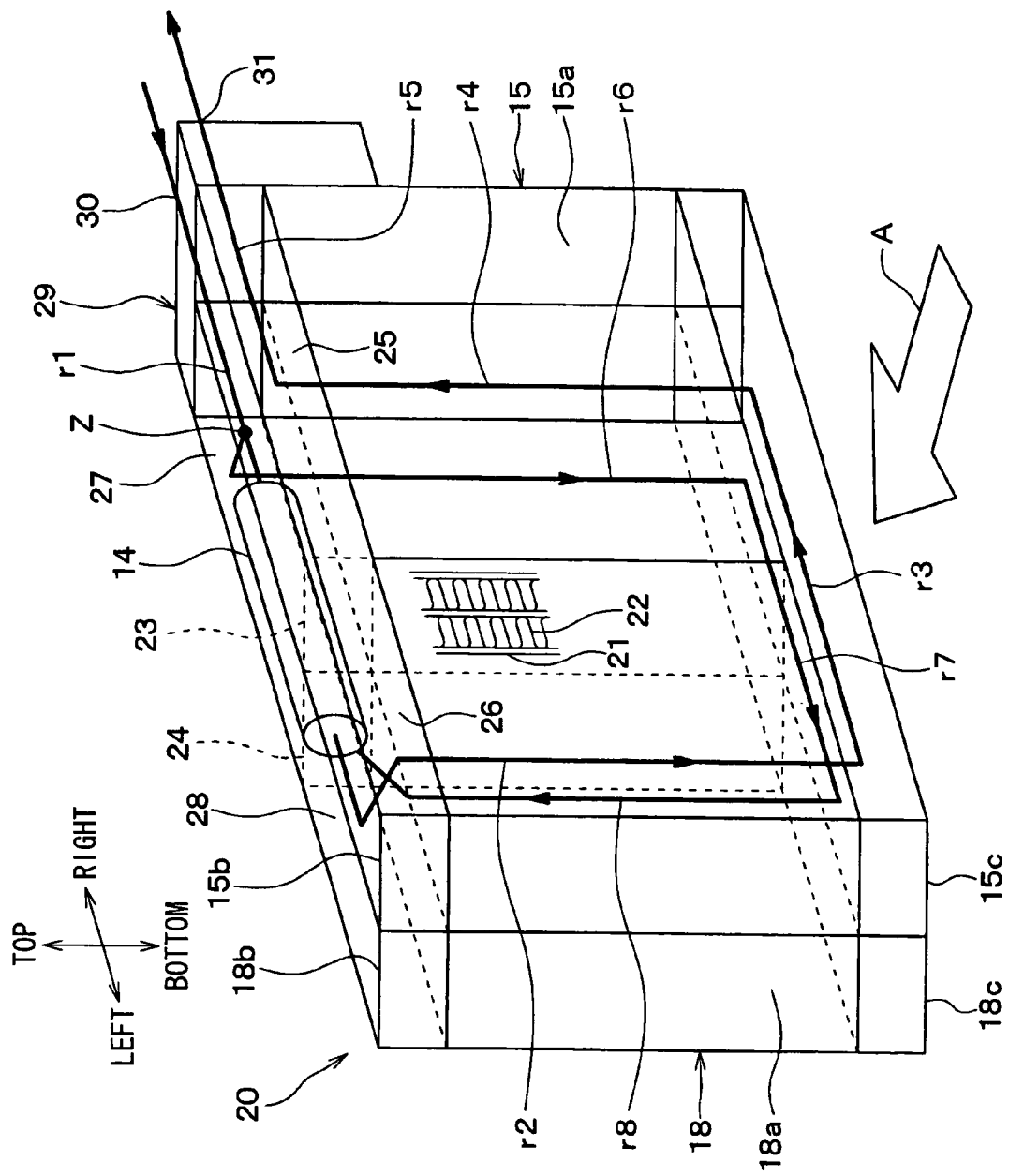
FIG. 2 is a perspective view showing a schematic structure of an evaporator unit in the first embodiment.
Figure 3:
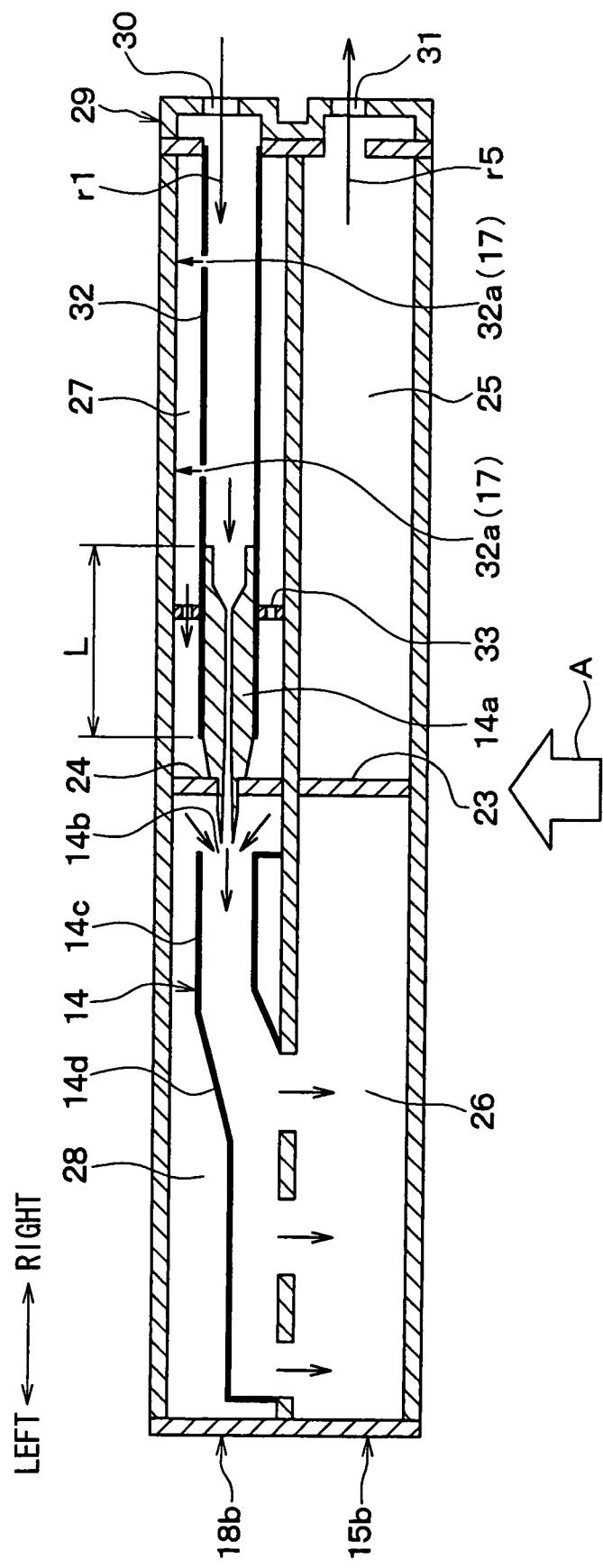
FIG. 3 is a schematic sectional view showing a tank portion in the evaporator unit of FIG. 2.
Figure 4:
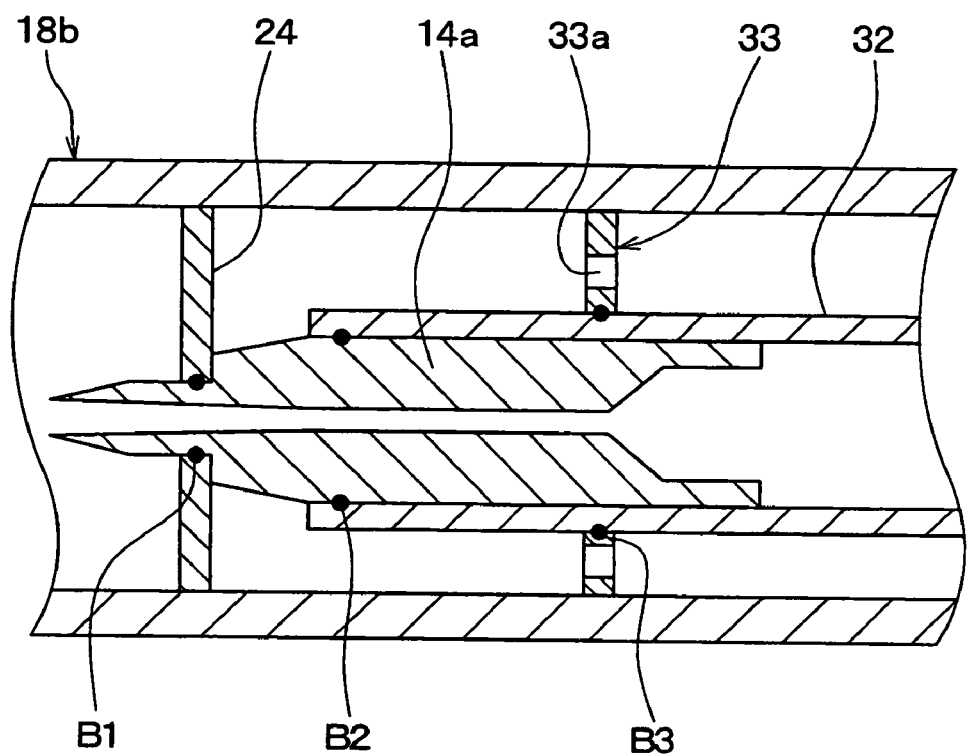
FIG. 4 is an enlarged view showing a part of the tank portion in FIG. 3.

In the present embodiment, the ejector 14, the first and second evaporators 15 and 18, and the throttle 17 are incorporated into one integrated unit 20. Now, specific examples of the evaporator unit 20 will be described below in detail with reference to FIGS. 2 to 4. FIG. 2 is a perspective view showing the integrated unit 20 having the first and second evaporators 15 and 18 and the ejector 14. FIG. 3 is a cross-sectional view of a tank portion of the integrated unit 20, and FIG. 4 is an enlarged sectional view showing a part of the tank portion of the integrated unit 20.

First, an example of the integrated unit 20 including the two evaporators 15 and 18 and the ejector 14 will be explained below with reference to FIG. 2. In the present embodiment of FIG. 2, the two evaporators 15 and 18 can be formed integrally into a completely single evaporator structure. Thus, the first evaporator 15 constitutes an upstream side area of the single evaporator structure in the direction of the air flow A, while the second evaporator 18 constitutes a downstream side area of the single evaporator structure in the direction of the air flow A.

In the example of the integrated unit 20 of FIG. 2, a side of the tank portion where the ejector 14 is located is indicated as the top direction, a side of the tank portion where the ejector 14 is not located is indicated as the bottom direction, an upstream refrigerant side of the nozzle portion 14a of the ejector 14 is indicated as the right direction, and a downstream refrigerant side of the diffuser 14d of the ejector 14 is indicated as the left direction, when being viewed from an upstream air side of the integrated unit 20 as in the arrow A of FIG. 2.

The evaporator unit 20 including the first evaporator 15, the second evaporator 18 and the ejector 14 is made of a metal material such as aluminum having a heat conduction and a brazing property. All the components of the evaporator unit 20 can be integrally bonded by brazing or can be integrated by using a fastening member.

The first evaporator 15 and the second evaporator 18 have the same basic structure, and include heat exchange cores 15a and 18a, and header tanks 15b, 15c, 18b, and 18c positioned on both upper and lower sides of the heat exchange cores 15a and 18a, respectively.

The heat exchanger cores 15a and 18a respectively include a plurality of tubes 21 extending in a tube longitudinal direction (e.g., vertically in FIG. 2). The tube 21 is a flat tube defining therein a refrigerant passage in which the refrigerant flows. One or more passages for allowing a heat-exchange medium, namely air to be cooled in the present embodiment, to pass therethrough are formed between these tubes 21. Between these tubes 21, fins 22 are disposed, so that the tubes 21 can be connected to the fins 22. Each of the heat exchange cores 15a and 18a is constructed of a laminated structure of the tubes 21 and the fins 22. These tubes 21 and fins 22 are alternately laminated in a lateral direction of the heat exchange cores 15a and 18a. In other embodiments, any appropriate structure without using the fins 22 in the heat exchange cores 15a and 18a may be employed.

In FIG. 2, only some of the fins 22 are shown, but in fact the fins 22 are disposed over the whole areas of the heat exchange cores 15a and 18a, and the laminated structure including the tubes 21 and the fins 22 is disposed over the whole areas of the heat exchange cores 15a and 18a. The blown air by the electric blower 19 is adapted to pass through voids (clearances) in the laminated structure of the tubes 21 and the fins 22.

The tube 21 constitutes the refrigerant passage through which refrigerant flows, and is made of a flat tube having a flat cross-sectional shape in the air flow direction A. The fin 22 is a corrugated fin made by bending a thin plate in a wave-like shape, and is connected to a flat outer surface of the tube 21 to expand a heat transfer area of the air side.

The header tanks 15b and 15c are located, respectively, at top and bottom sides of the heat exchange core 15a, and the header tanks 18b and 18c are located, respectively, at top and bottom sides of the heat exchange core 18a. In the first embodiment, the ejector 14 is located in the upper header tank 18b, as an example.

The header tanks 15b, 15c, 18b, 18c are connected to end portions of the tubes 21 in the longitudinal direction to distribute the refrigerant into the tubes 21 and to collect the refrigerant from the tubes 21.

The header tanks 15b, 15c located on both the top and bottom sides of the first evaporator 15 have tube-fitting hole part (not shown), and both top and bottom end portions of the tubes 21 of the heat exchange core 15a are inserted into and are bonded to the tube-fitting hole part, such that the both top and bottom end portions of the tubes 21 communicate with the inner space of the header tanks 15b, 15c.

Similarly, the header tanks 18b, 18c located on both top and bottom sides of the second evaporator 18 have tube-fitting hole part (not shown), and both top and bottom end portions of the tubes 21 of the heat exchange core 18a are inserted into and are bonded to the tube-fitting hole part, such that the both top and bottom end portions of the tubes 21 communicate with the inner space of the header tanks 18b, 18c.

The tubes 21 of the heat exchanger core 15a and the tubes 21 of the heat exchanger core 18a independently constitute the respective refrigerant passages. The header tanks 15b and 15c on both upper and lower sides of the first evaporator 15, and the header tanks 18b and 18c on both upper and lower sides of the second evaporator 18 independently constitute the respective refrigerant passage spaces.

Thus, the header tanks 15b, 15c, 18b, and 18c disposed on both upper and lower sides serve to distribute the refrigerant to the respective tubes 21 of the heat exchange cores 15a and 18a, and to collect the refrigerant from the tubes 21 of the heat exchange cores 15a and 18a.

Since the two upper header tanks 15b and 18b are adjacent to each other, the two upper header tanks 15b and 18b can be molded integrally to form an upper tank portion of the integrated unit 20. The same can be made for the two lower header tanks 15c and 18c so as to form a lower tank portion of the integrated unit 20. It is apparent that the two upper header tanks 15b and 18b may be molded independently as independent components, and that the same can be made for the two lower header tanks 15c and 18c.

A partition plate 23 is located in the upper header tank 15b of the first evaporator 15 at a center portion in a tank longitudinal direction (e.g., left-right direction corresponding to the width direction of the evaporator unit), to partition an inner space of the upper header tank 15b into a right space 25 and a left space 26. The partition plate 23 can be brazed to an inner wall surface of the upper header tank 15b. Similarly, a partition plate 24 is located in the upper header tank 18b of the second evaporator 18 at a center portion in a tank longitudinal direction (e.g., left-right direction), to partition an inner space of the upper header tank 18b into a right space 27 and a left space 28. The partition plate 24 can be brazed to an inner wall surface of the upper header tank 18b. Furthermore, as shown in FIG. 3, a nozzle support plate 33 is located in the right space 27 of the upper header tank 18b to support the nozzle portion 14a of the ejector 14. In the present embodiment, the partition plate 24 and the nozzle support plate 33 are located to support the nozzle 14a of the ejector 14.

On the other hand, no partition plate is located in the lower header tanks 15c, 18c of the first and second evaporators 15, 18. Therefore, the inner space of the lower header tank 15c of the first evaporator 15 is a single communicating space, and the inner space of the lower header tank 18c of the second evaporator 18 is a single communicating space.

As shown in FIG. 2, a connection block 29 is brazed and fixed to a side surface portion of the upper header tanks 15b, 18b, positioned at one end side in the tank longitudinal direction (e.g., left-right direction). The connection block 29 is provided with a single refrigerant inlet 30 and a single refrigerant outlet 31 of the evaporator unit 20 shown in FIG. 1.

The refrigerant inlet 30 of the connection block 29 is connected to a refrigerant downstream side of the expansion valve 13. In the evaporator unit 20, the refrigerant inlet 30 of the connection block 29 communicates with the right space 27 of the upper header tank 18b. The refrigerant outlet 31 of the connection block 29 communicating with the right space 25 of the upper header tank 15b of the first evaporator 15 is connected to the refrigerant suction side of the compressor 11.

The ejector 14 is located inside the upper header tank 18b of the second evaporator 18. In the ejector 14 of the first embodiment shown in FIG. 3, the nozzle portion 14a is separated from the mixing portion 14c while the mixing portion 14c and the diffuser 14d are integrally formed in the upper header tank 18b.

The nozzle portion 14a has an outlet portion on a side of the jet port, and the outlet portion of the nozzle portion 14a is inserted into an insertion hole of the partition plate 24 such that the nozzle portion 14a is arranged in the upper header tank 18b over the right space 27 and the left space 28, as shown in FIG. 3. Thus, the refrigerant inlet of the nozzle portion 14a is positioned in the right space 27 of the upper header tank 18b, and the jet port of the nozzle portion 14a is positioned in the left space 28 of the upper header tank 18b.

The nozzle portion 14a of the ejector 14 and the partition plate 24 are brazed to be air-tightly sealed and fixed to each other. FIG. 4 schematically shows a brazing point B1 between the nozzle portion 14a and the partition plate 24, a brazing point B2 between the nozzle portion 14a and a nozzle inlet pipe 32, and a brazing point B3 between the nozzle inlet pipe 32 and the nozzle support plate 33.

As shown in FIG. 3, the mixing portion 14c and the diffuser 14d of the ejector 14 are entirely arranged in the left space 28 of the upper header tank 18b. In the example of FIG. 3, the suction port 14b is constructed by the inlet side opening of the mixing portion 14c. Therefore, the inlet side opening of the mixing portion is positioned coaxially with the nozzle portion 14a, and is directly opened to the left space 28 of the upper header tank 18b. The jet port of the nozzle portion 14a is positioned close to the inlet side opening of the mixing portion 14c.

Thus, the suction port 14b is formed around an entire outside circumference of only a tip portion of the nozzle portion 14a. The mixing portion 14c is formed approximately into a cylindrical shape, and the diffuser 14d is enlarged from the mixing portion 14c in passage section such that the outlet of the diffuser 14d is directly open to the left space 26 of the upper header tank 15b of the first evaporator 15.

The mixing portion 14c and the diffuser 14d can be fixed to the upper header tank 18b by using a suitable fastening member, or can be brazed to the upper header tank 18b. FIG. 3 shows one example of the shapes of the mixing portion 14c and the diffuser 14d. However, the shapes of the mixing portion 14c and the diffuser 14d can be suitably changed without being limited to the shapes of the mixing portion 14c and the diffuser 14d shown in FIG. 3.

In the example of FIG. 3, the refrigerant inlet 30 and the refrigerant outlet 31 are provided in the connection block 29 fixed to the right end surface of the upper header tanks 18b and 15b. The refrigerant inlet of the nozzle portion 14a communicates with the refrigerant inlet 30 via the inner space of the nozzle inlet pipe 32. An inlet side portion of the nozzle portion 14a is inserted into one end portion of the nozzle inlet pipe 32, and the other end portion of the nozzle inlet pipe 32 is inserted into a hole formed in a side wall (i.e., right side wall in FIG. 3) of the upper header tank 18b.

The one end portion of the nozzle inlet pipe 32 is brazed to the nozzle portion 14a so that an insertion portion (overlapped portion) between the one end portion of the nozzle inlet pipe 32 and the nozzle portion 14a can be air tightly sealed. The nozzle portion 14a and the nozzle inlet pipe 32 are brazed at least at about the point B2 of FIG. 4, for example. The point B2 of FIG. 4 only schematically shows a brazing position between the nozzle portion 14a and the nozzle inlet pipe 32. The other end portion of the nozzle inlet pipe 32 opposite to the nozzle portion 14a is brazed to the side wall surface of the upper header tank 18b to be air-tightly sealed.

An insertion length L of the nozzle portion 14a into the nozzle inlet pipe 32 is set in accordance with the dimension of the right space 27 in the tank longitudinal direction (i.e., left-right direction in FIG. 3). Therefore, by adjusting the insertion length L of the nozzle portion 14a into the nozzle inlet pipe 32, it is possible for the nozzle portion 14a to be used for header tanks having different lengths in the tank longitudinal direction. That is, by adjusting the insertion length L of the nozzle portion 14a into the nozzle inlet pipe 32, it is possible for the nozzle portion 14a to be assembled to various kinds of the evaporators 15, 18 having different width dimensions in the left-right direction.

In the present embodiment, the branch passage 16 and the throttle mechanism 17 are configured by using the nozzle inlet pipe 32. As shown in FIG. 3, holes (orifices) 32a are formed in a pipe wall of the nozzle inlet pipe 32, so that a part of refrigerant flowing into the nozzle inlet pipe 32 from the refrigerant inlet 30 is decompressed while passing through the holes 32a as the throttle 17, and flows into the right space 27 outside of the nozzle inlet pipe 32 in the upper header tank 18b.

Thus, the branch portion Z and a part of the branch passage 16 shown in FIG. 1 are formed in the nozzle inlet pipe 32, and the throttle 17 is constructed with the holes 32a. In the example of FIG. 3, two holes 32a are arranged at two positions of the nozzle inlet pipe 32 in the tank longitudinal direction. However, one hole 32a may be formed in the nozzle inlet pipe 32 as the throttle 17, or plural holes 32a more than two may be formed in the nozzle inlet pipe 32a as the throttle 17. The number of the holes 32a and the arrangement positions thereof in the nozzle inlet pipe 32 may be suitably changed without being limited to the example of FIG. 3.

The nozzle support plate 33 air-tightly connected to the outer peripheral surface of the nozzle inlet pipe 32 protrudes outwardly and is fixed by brazing to an inner wall surface of the upper header tank 18b in the right space 27. The nozzle support plate 33 and the nozzle portion 14a are connected and fixed via the nozzle inlet pipe 32. The point B3 of FIG. 4 schematically shows a brazing position between the nozzle support plate 33 and the nozzle inlet pipe 32.

The nozzle support plate 33 is located in the right space 27 to partition the right space 27 into two space parts in the tank longitudinal direction. A communication hole 33a through which the two space parts of the right space 27 communicates with each other is provided in the nozzle support plate 33 to penetrate through the nozzle support plate 33.

The refrigerant flow in the entire evaporator unit 20 will be described with reference to FIGS. 2 and 3. First, refrigerant flows into the nozzle inlet pipe 32 from the refrigerant inlet 30 of the connection block 29 as shown in the arrow r1, and the refrigerant flowing into the nozzle inlet pipe 32 is branched into first and second streams. The refrigerant of the branched first stream flows straightly in the nozzle inlet pipe 32 and flows into the nozzle portion 14a of the ejector 14. In contrast, the refrigerant of the branched second stream flows into the right space 27 of the upper header tank 18b via the holes 32a of the nozzle inlet pipe 32.

The refrigerant flowing into the nozzle portion 14a of the ejector 14 is jetted from the jet port of the nozzle portion 14a to passes through the mixing portion 14c and the diffuser 14d, and flows into the left space 26 of the upper header tank 15b of the first evaporator 15. The refrigerant is decompressed while passing through the nozzle portion 14a of the ejector 14, and refrigerant in the left space 28 is drawn from the suction port 14b by the jet flow of refrigerant jetted from the jet port of the nozzle portion 14a. Therefore, the refrigerant jetted from the nozzle portion 14a and the refrigerant drawn from the suction port 14b are mixed in the mixing portion 14c, and the mixed refrigerant is pressurized in the diffuser 14d.

The refrigerant flowing out of the diffuser 14d of the ejector 14 into the left space 26 of the upper header tank 15b of the first evaporator 15 is distributed into the plural tubes 21 on the left side portion of the heat exchange core 15a, and flows downwardly in the tubes 21 as in the arrow r2 to be collected into the lower header tank 15c of the first evaporator 15. Because no partition plate is provided in the lower header tank 15c, the refrigerant flows in the lower header tank 15c as in the arrow r3 from the left side to the right side in FIG. 2.

The refrigerant flowing into the right side portion within the lower header tank 15c flows upwardly through the tubes 21 positioned at the right side portion of the heat exchange core 15a as in the arrow r4 in FIG. 2 to flow into the right space 25 of the upper header tank 15b. Furthermore, the refrigerant collected into the right space of the upper header tank 15b of the first evaporator 15 flows out of the evaporator unit 20 via the refrigerant outlet 31 of the connection block 29 as in the arrow r5.

On the other hand, the refrigerant of the branched second stream flowing into the right space 27 of the upper header tank 18b via the holes 32a of the nozzle inlet pipe 32 is distributed into the tubes 21 of the right side portion of the heat exchange core 18a of the second evaporator 18, and flows downwardly through the tubes 21 as in the arrow r6 to collect the lower header tank 18c on the right side. Because no partition member is located in the lower header tank 18c, the refrigerant flows in the lower header tank 18c from the right side to the left side in FIG. 2 as in the arrow r7.

The refrigerant on the left side of the lower header tank 18c flows upwardly through the tubes 21 of the left side portion of the heat exchange core 18a as in the arrow r8 in FIG. 2, and is collected to the left space 28 of the upper header tank 18b. The refrigerant in the left space 28 of the upper header tank 18b is drawn into the mixing portion 14c from the suction port 14b of the ejector 14 by the jet flow of the refrigerant jetted from the nozzle portion 14a, as described above.

Because the evaporator unit 20 has therein the refrigerant passage structure, the single refrigerant inlet 30 is provided in the connection block 29 to be used for the refrigerant passage structure of the evaporator unit 20, and the single refrigerant outlet 31 is provided in the connection block 29 to be used for the refrigerant passage structure of the evaporator unit 20.

Now, an operation of the refrigerant cycle device according to the first embodiment will be described. When the compressor 11 is driven by a vehicle engine, the high-temperature and high-pressure refrigerant compressed by and discharged from the compressor 11 flows into the radiator 12 where the high-temperature refrigerant is cooled and condensed by the outside air. The high-pressure refrigerant flowing out of the radiator 12 flows into the liquid receiver 12a within which the refrigerant is separated into liquid and vapor phases. The liquid refrigerant is derived from the liquid receiver 12a and passes through the expansion valve 13.

The expansion valve 13 adjusts the degree of opening of the valve to adjust a refrigerant flow amount, such that the superheat degree of the refrigerant on the refrigerant outlet side of the first evaporator 15 becomes a predetermined value, while the high-pressure refrigerant is decompressed. Here, the refrigerant on the refrigerant outlet side of the first evaporator 15 corresponds to the refrigerant to be drawn to the compressor 11. The refrigerant having passed through the expansion valve 13 flows into the refrigerant inlet 30 provided in the connection block 29 of the evaporator unit 20. The refrigerant after passing through the expansion valve 13 has a middle pressure.

The refrigerant flowing into the evaporator unit 20 from the refrigerant inlet 30 is branched at the branch portion Z to be divided into the refrigerant stream (first stream) directed to the nozzle portion 14a of the ejector 14, and the refrigerant stream (second stream) directed to the throttle 17.

The refrigerant flowing into the ejector 14 is decompressed and expanded by the nozzle portion 14a. Thus, the pressure energy of the refrigerant is converted into the speed energy at the nozzle portion 14a, and the refrigerant is ejected from the jet port of the nozzle portion 14a at high speed. At this time, the pressure drop of the refrigerant around the jet port of the nozzle portion 14a causes to draw from the refrigerant suction port 14b, the refrigerant (vapor-phase refrigerant) having passed through the heat exchange core 18a of the second evaporator 18.

The refrigerant ejected from the nozzle portion 14a and the refrigerant drawn from the refrigerant suction port 14b are combined in the mixing portion 14c on the downstream side of the nozzle portion 14a to flow into the diffuser 14d. In the diffuser 14d, the speed (expansion) energy of the refrigerant is converted into the pressure energy by enlarging the passage sectional area, resulting in increased pressure of the refrigerant.

The refrigerant flowing out of the diffuser 14d of the ejector 14 flows through the refrigerant flow paths indicated by the arrows r2 to r5 in FIG. 2. During this time, in the heat exchange core 15a of the first evaporator 15, the low-temperature and low-pressure refrigerant absorbs heat from the blown air in the direction of the arrow "A" so as to be evaporated. The vapor-phase refrigerant evaporated is drawn from the single refrigerant outlet 26 into the compressor 11, and is compressed again in the compressor 11.

The refrigerant flowing into the throttle 17 is decompressed to become a low-pressure refrigerant (liquid-vapor two-phase refrigerant). The low-pressure refrigerant flows through the refrigerant flow passages in the second evaporator 18 as indicated by the arrows r6 to r8 of FIG. 2. During this time, in the heat exchange core 18a of the second evaporator 18, the low-temperature and low-pressure refrigerant absorbs heat from the blown air having passed through the first evaporator 15 to be evaporated. The vapor-phase refrigerant evaporated in the heat exchange core 18a of the second evaporator 18 is drawn from the refrigerant suction port 14b into the ejector 14.

According to the first embodiment, because the nozzle portion 14a of the ejector 14 can be brazed integrally with the first and second evaporators 15, 18 in the evaporator unit 20, the assemble work of the evaporator unit 20 can be made simple as compared with a case where the nozzle portion 14a is assembled to the integrated structure of the first and second evaporators 15, 18 after being brazed. Therefore, the productivity of the evaporator unit 20 can be improved while the manufacturing cost of the evaporator unit 20 can be reduced.

Furthermore, in a case where the mixing portion 14c and the diffuser 14d are fixed to the upper header tank 18b by brazing, the entire of the ejector 14 can be integrally brazed to the first and second evaporators 15, 18. In this case, an assembling step for assembling the ejector 14 to the first and second evaporators 15, 18 after brazing can be omitted. In this case, the productivity of the evaporator unit 20 can be further improved while the manufacturing cost of the evaporator unit 20 can be further reduced.

In the first embodiment, the nozzle portion 14a can be brazed partially at the plural positions B1, B2 separated from each other, a deformation of a very small passage within the nozzle portion 14a, due to thermal contraction after the brazing, can be reduced, as compared with a case where all the outer surface of the nozzle portion 14a is brazed.

Furthermore, the brazing positions B1 and B2 of the nozzle portion 14a are arranged at positions except for the inlet and outlet of the nozzle portion 14a. Therefore, it can prevent a brazing metal melted in the brazing from flowing into the very small passage in the nozzle portion 14a, thereby preventing the very small passage in the nozzle portion 14a from being closed.

In the present embodiment, by simply forming the holes 32a in the nozzle inlet pipe 32, the branch passage 16 and the throttle mechanism 17 can be constructed in the evaporator unit 20, thereby reducing the product cost.

Furthermore, because the plural holes 32a are formed in the nozzle inlet pipe 32 at plural positions, it can prevent a bias flow of the refrigerant within the right space 27 of the upper header tank 18b of the second evaporator 18, so that the refrigerant can flow in uniform in the entire area of the right space 27 of the upper header tank 18b of the second evaporator 18.

According to the example of FIG. 3 of the first embodiment, because it is possible to adjust the insert dimension L of the nozzle portion 14a inserted into the nozzle inlet pipe 32, the compatibility of the ejector 14 relative to the first and second evaporators 15, 18 having different dimensions in the tank longitudinal direction can be improved.

Figure 5:
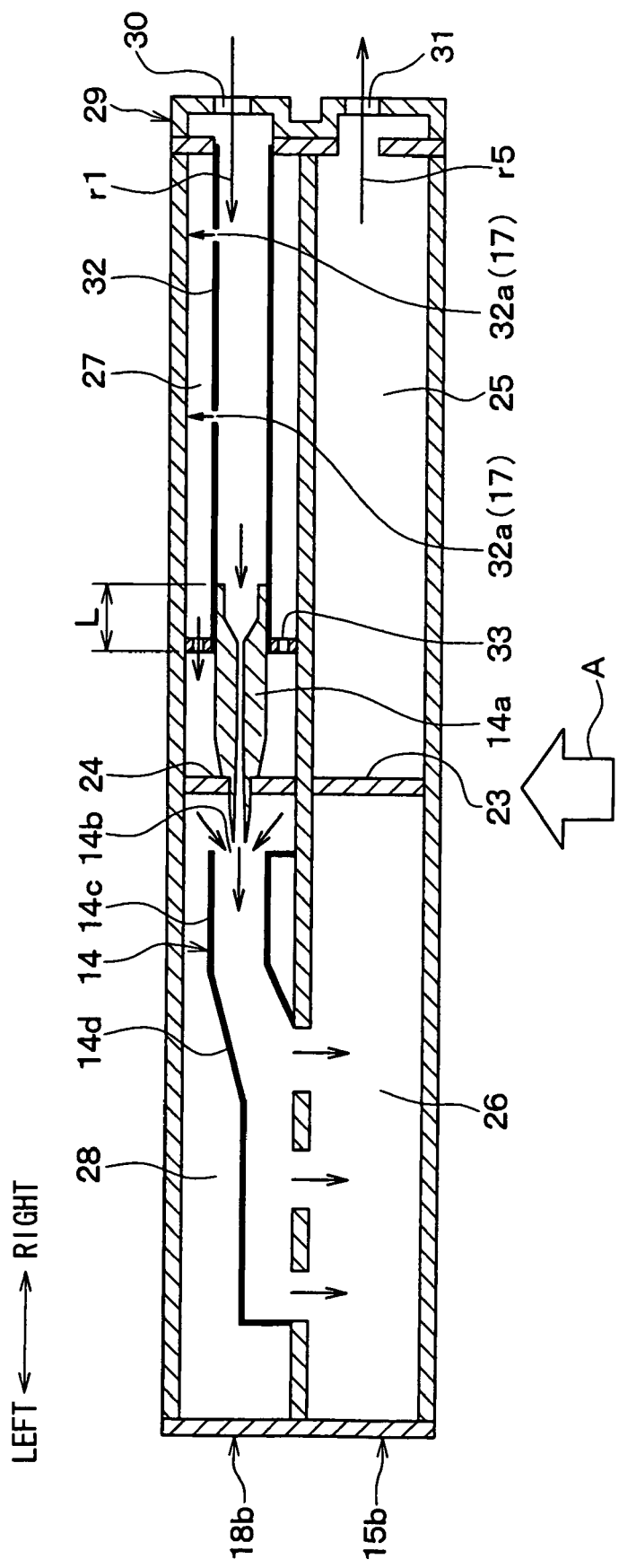
FIG. 5 is a schematic sectional view showing a tank portion in an evaporator unit according to a modification of the first embodiment.

FIG. 5 is a schematic sectional view showing a tank portion of an evaporator unit according to a modification of the first embodiment of the present invention. In the modification example of FIG. 5, the dimension of both the first and second evaporators 15, 18 in the tank longitudinal direction (i.e., the left-right direction in FIG. 5) is made larger than that of FIG. 3. In the example of FIG. 5, by setting the insertion length L of the nozzle portion 14a into the nozzle inlet pipe 32 to be smaller as compared with the example of FIG. 3, the ejector 14 used in the example of FIG. 3 can be used for the first and second evaporators 15, 18.

As described above, by only changing the insertion length L between the nozzle portion 14a and the nozzle inlet pipe 32, the compatibility of the ejector 14 relative to various types of the first and second evaporators 15, 18 with different lengths in the tank longitudinal direction (evaporator width direction) can be improved, thereby reducing the product cost.

The length of the nozzle inlet pipe 32 itself may be changed instead of the change of the insertion length L of the nozzle portion 14a into the nozzle inlet pipe 32. Even in this case, the compatibility of the ejector 14 relative to the different widths of the first and second evaporators 15, 18 can be obtained.

According to the first embodiment of the present invention, because the nozzle portion 14a is supported by the partition plate 24 and the nozzle support plate 33, the support strength of the nozzle portion 14a can be improved, thereby reducing radiation noise from the first and second evaporators 15, 18.

Thus, a variation in the nozzle portion 14a caused while the refrigerant passes in the nozzle portion 14a can be reduced, thereby reducing a variation transmitted from the nozzle portion 14a to the first and second evaporators 15, 18. Therefore, it can further reduce the radiation noise from the first and second evaporators 15, 18.

In addition, in the first embodiment of the present invention, the following advantages and effects can be obtained.

(1) Because the refrigerant downstream of the diffuser 14d of the ejector 14 is supplied to the first evaporator 15 while the refrigerant branched at the branch portion Z is supplied to the second evaporator 18 via the throttle 17, cooling capacity can be obtained in both the first and second evaporators 15 and 18 at the same time. Therefore, the air cooled by both the first and second evaporators 15, 18 can be blown into a space to be cooled, thereby sufficiently cooling the space to be cooled.

The refrigerant evaporation pressure of the first evaporator 15 corresponds to the refrigerant pressure pressurized in the diffuser 14d. On the other hand, because the refrigerant outlet side of the second evaporator 18 is connected to the refrigerant suction port 14b of the ejector 14, the lowest pressure immediately after the decompression of the nozzle portion 14a can be applied to the second evaporator 18.

Accordingly, the refrigerant evaporation pressure (refrigerant evaporation temperature) of the second evaporator 18 can be made lower than the refrigerant evaporation pressure (refrigerant evaporation temperature) of the first evaporator 15. Furthermore, the first evaporator 15 having a relatively high refrigerant evaporation temperature is arranged upstream of the second evaporator 18 having a relatively low refrigerant evaporation temperature, in the flow direction A of air. Therefore, both a temperature difference between the refrigerant evaporation temperature and the temperature of the blown air in the first evaporator 15, and a temperature difference between the refrigerant evaporation temperature and the temperature of the blown air in the second evaporator 18 can be sufficiently obtained.

Therefore, cooling performance can be improved in both of the first evaporator 15 and the second evaporator 18, thereby improving cooling performance by using the combination of both the first and second evaporators 15, 18. Furthermore, because the refrigerant pressure is increased in the diffuser 14d of the ejector 14, the refrigerant suction pressure of the compressor 11 can be increased, thereby reducing the drive power of the compressor 11.

(2) The refrigerant downstream area (e.g., right upper area of FIG. 2) in the heat exchange core 15a of the first evaporator 15 and the refrigerant downstream area (e.g., left upper area of FIG. 2) in the heat exchange core 18a of the second evaporator 18 are arranged to be shifted from each other when being viewed from the flow direction A of air. That is, the refrigerant superheat area in the heat exchange core 15a of the first evaporator 15 and the refrigerant superheat area in the heat exchange core 18a of the second evaporator 18 are arranged to be shifted from each other when being viewed from the flow direction A of air. Therefore, the air having passed through the refrigerant superheat area of the first evaporator 15 can be sufficiently cooled by the second evaporator 18.

On the other hand, the air to pass through the refrigerant superheat area of the second evaporator 18 can be sufficiently cooled in the first evaporator 15. As a result, it can prevent the temperature distribution of air blown from the second evaporator 18 from being greatly different from each other.

(3) Furthermore, because the ejector 14 is located inside the upper header tank 18b of the second evaporator 18, the mounting performance of the evaporator unit 20 can be improved, and the pressure loss caused in the refrigerant cycle device can be reduced. Furthermore, because the refrigerant inlet 30 and the refrigerant outlet 31 are arranged adjacent to each other in the evaporator unit 20, the evaporator unit 20 can be easily connected to other components of the refrigerant cycle device, thereby improving the mounting performance of the refrigerant cycle device.

In the above-described first embodiment, the inlet side portion of the nozzle portion 14a is inserted into the nozzle inlet pipe 32. However, a downstream end portion of the nozzle inlet pipe 32 may be inserted into the inlet side portion of the nozzle portion 14a.

Second Embodiment

Figure 6:
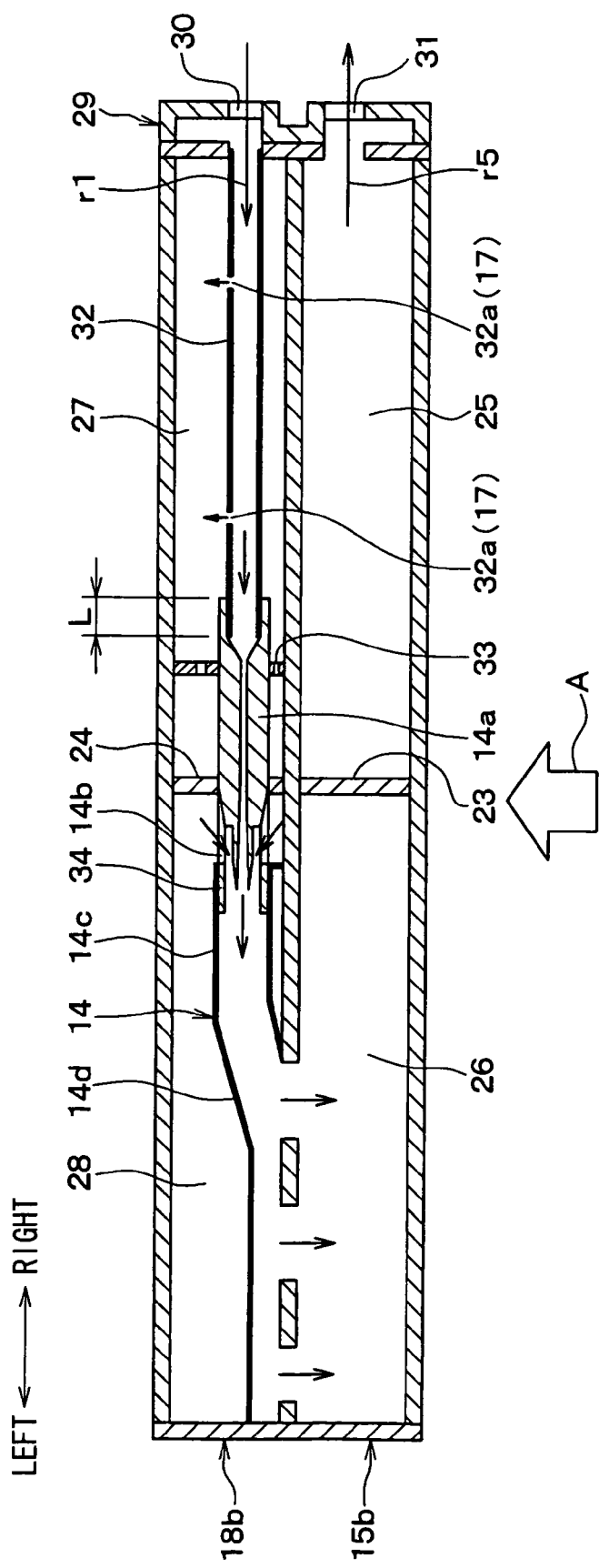
FIG. 6 is a schematic sectional view showing a tank portion in an evaporator unit according to a second embodiment of the present invention.

In the above-described first embodiment, the nozzle portion 14a and the mixing portion 14c are located separately from each other. However, in the second embodiment, as shown in FIG. 6, the nozzle portion 14a and the mixing portion 14c are connected in the ejector 14.

A pipe portion 34 is formed at a tip end portion (downstream end portion) of the nozzle portion 14a. The pipe portion 34 is inserted into an inlet portion of the mixing portion 14c, and an outer peripheral surface of the pipe portion 34 is brazed onto an inner peripheral surface of the mixing portion 14c in the inserted portion, thereby air-tightly fixing the pipe portion 34 to the mixing portion 14c of the ejector 14. In this case, assemble accuracy such as a coaxial accuracy between the mixing portion 14c and the nozzle portion 14a can be improved in the ejector 14.

A hole is provided in a pipe wall of the pipe portion 34 at a position outside of the mixing portion 14c so as to define and construct the refrigerant suction port 14b.

In the above-described first embodiment, the inlet side portion of the nozzle portion 14a is inserted into the nozzle inlet pipe 32. However, in the second embodiment, as shown in FIG. 6, an end portion of the nozzle inlet pipe 32 is inserted into the inlet side portion of the nozzle portion 14a so as to have an insertion length L.

Thus, in the second embodiment of the present invention, the nozzle support plate 33 and the nozzle portion 14a can be directly fixed by brazing without interposing the nozzle inlet pipe 32 therebetween. The end portion of the nozzle inlet pipe 32 is air-tightly connected to the inlet portion of the nozzle portion 14a by brazing.

In the second embodiment, the other parts of the evaporator unit 20 may be similar to those of the above-described first embodiment.

Third Embodiment

A third embodiment of the present invention will be described with reference to FIGS. 7 and 8. In the above-described first embodiment, the ejector 14 is located inside the upper header tank 18b of the second evaporator 18. However, in the third embodiment, a separate tank 40 is located separately from the upper header tanks 15b, 18b, to accommodate therein the ejector 14. That is, the separate tank 40 is located outside the upper header tanks 15b and 18b at a valley portion between the upper header tanks 15b and 18b to contact both the upper header tanks 15b and 18b. The separate tank 40 can be used exclusively for the ejector 14.

The separate tank 40 has a cylindrical shape extending in the tank longitudinal direction of the upper header tanks 15b, 18b. The separate tank 40 is located at the valley portion between the upper header tanks 15b and 18b, and is integrally brazed to the outer surfaces of the upper header tanks 15b, 18b. In the third embodiment, the inner diameter of the separate tank 40 is set in constant.

A communication hole 41, through which the left space 28 of the upper header tank 18b of the second evaporator 18 communicates with the inside of the separate tank 40, is provided at a position corresponding to a middle portion in the longitudinal direction of the separate tank 40. In the example of FIG. 7, one communication hole 41 is provided such that the left space 28 of the upper header tank 18b of the second evaporator 18 communicates with the inside of the separate tank 40 through the communication hole 41. However, plural communication holes 41 may be provided at different positions. For example, the plural communication holes 41 may be provided at different positions in the longitudinal direction of the separate tank 40, or at different positions in the circumferential direction of the cylindrical shape of the separate tank 40.

An end surface (not shown) of one end side (e.g., the right end side in FIG. 8) of the separate tank 40 in the longitudinal direction is fixed to the connection block 29 by brazing. The other end side (e.g., the left end side in FIG. 8 more than the communication hole 41) of the separate tank 40 is made to communicate with the left space 26 of the upper header tank 15b of the first evaporator 15 via a communication hole.

The nozzle portion 14a of the ejector 14 is located in the separate tank 40 such that the jet port of the nozzle portion 14a is open toward the other end side (e.g., the left end side in FIG. 8) of the separate tank 40. Furthermore, a tip portion of the nozzle portion 14a is formed into a taper shape at a refrigerant outlet side. The taper-shaped tip portion of the nozzle portion 14a is positioned to face the communication hole 41, so that the arrangement position of the nozzle portion 14a of the ejector 14 can be determined. In the example of FIG. 8, the outer diameter of the nozzle portion 14a except for the taper-shaped tip portion has generally a constant outer diameter, and all the nozzle portion 14a is located in the separate tank 40.

Figure 8:
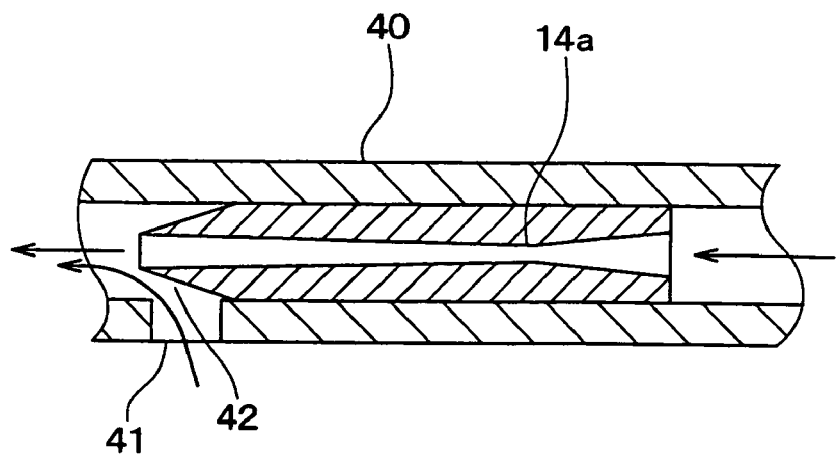
FIG. 8 is a cross-sectional view showing a separate tank of FIG. 7.

The mixing portion 14c and the diffuser 14d of the ejector 14 are provided downstream of the nozzle portion 14a within the separate tank 40 although it is omitted in FIG. 8. For example, similarly to the first embodiment, the inlet side opening portion of the mixing portion 14c may be configured to define the suction port 14b of the ejector 14. Furthermore, a suction refrigerant passage 42, through which the refrigerant to be drawn into the refrigerant suction port 14b flows, is provided at a radial outside of the taper-shaped tip portion of the nozzle portion 14a.

The nozzle portion 14a is temporally fixed into the separate tank 40 by using a fastening member, or by fitting the nozzle portion 14a into the separate tank 40. When the nozzle portion 14a is temporally fixed to the separate tank 40 by fitting the nozzle portion 14a into the separate tank 40, the outer peripheral surface of the nozzle portion 14a is used as a temporally fixing portion. When the nozzle portion 14a is temporally fixed to the separate tank 40 by using a fastening member on the nozzle portion 14a, the fastening portion is used as the temporally fixing portion.

After the nozzle portion 14a is temporally fixed into the separate tank 40 at the fastening portion, the nozzle portion 14a is integrally brazed to the separate tank 40 together with the evaporator unit 20. For example, the outer peripheral surface of the nozzle portion 14a except for the taper-shaped tip portion is brazed to the separate tank 40. In this case, the outer peripheral surface of the nozzle portion 14a except for the position facing the suction refrigerant passage 42 can be brazed to the separate tank 40.

As an example, the nozzle portion 14a is formed by a clad material such that a brazing material is applied to the outer peripheral surface of the nozzle portion 14a. In this case, the nozzle portion 14a can be easily brazed integrally with the separate tank 40. The separate tank 40 may be formed by a clad material such that an inner wall surface of the separate tank 40 is covered by a brazing material, instead of the nozzle portion 14a. Alternatively, both the nozzle portion 14a and the separate tank 40 may be formed by a clad material such that the outer peripheral surface of the nozzle portion 14a and the inner wall surface of the separate tank 40 are covered by a brazing material.

The mixing portion 14c and the diffuser 14d of the ejector 14 may be fixed to the separate tank 40 by brazing similarly to that of the nozzle portion 14a, or may be fixed by using a suitable fastening member.

In the third embodiment, because the ejector 14 is not located inside the upper header tank 18b of the second evaporator 18, the nozzle inlet pipe 32 described in the first embodiment may be omitted.

In the third embodiment, the connection block 29 is configured to have a branch portion with a branch function for branching the refrigerant flowing from the refrigerant inlet 30 into the refrigerant stream flowing toward the right space 27 of the upper header tank 18b and the refrigerant stream flowing into the inlet side end portion of the nozzle portion 14a. The connection block 29 with the branch function is not shown.

In the above-described first embodiment, the throttle 17 is configured by using the holes 32a of the nozzle inlet pipe 32. However, in the third embodiment, the throttle 17 is configured by using an orifice hole (not shown) that is provided in a communication portion between the connection block 29 and the right space 27 of the upper tank 18b.

Next, a refrigerant flow passage in the evaporator unit 20 according to the third embodiment of the present invention will be described with reference to FIGS. 2, 7 and 8. The refrigerant flowing into the right space 27 of the upper header tank 18b from the refrigerant inlet 30 of the connection block 29 is branched into a refrigerant stream flowing into one side (e.g., right side in FIG. 8) of the longitudinal direction of the separate tank 40, and a refrigerant stream distributed into the tubes 21 of the right side portion of the heat exchange core 18a of the second evaporator 18.

The refrigerant flowing into the one side (e.g., right side in FIG. 8) of the longitudinal direction of the separate tank 40 flows into the nozzle portion 14a of the ejector 14 to be jetted from the nozzle portion 14a, and passes through the mixing portion 14c and the diffuser 14d in the separate tank 40. The refrigerant is decompressed while passing through the nozzle portion 14a of the ejector 14, is mixed with the refrigerant drawn from the refrigerant suction port 14b in the mixing portion 14c, and is pressurized in the diffuser 14d of the ejector 14.

Low-pressure refrigerant after the decompression in the ejector 14 flows out of the other end side (e.g., left side in FIG. 8) of the longitudinal direction of the separate tank 40, and flows into the left space 26 of the upper header tank 15b of the first evaporator 15 via the communication hole (not shown). The refrigerant flowing into the left space 26 of the upper header tank 15b flows in the refrigerant passages as in the arrows r2 to r5 of FIG. 2, and flows out of the refrigerant outlet 31 of the connection block 29.

In contrast, the refrigerant distributed into the plural tubes 21 of the right side portion of the heat exchange core 18a of the second evaporator 18 flows in the refrigerant passages as in the arrows r6 to r8 of FIG. 2, and is joined to the left space 28 of the upper header tank 18b.

Figure 7:
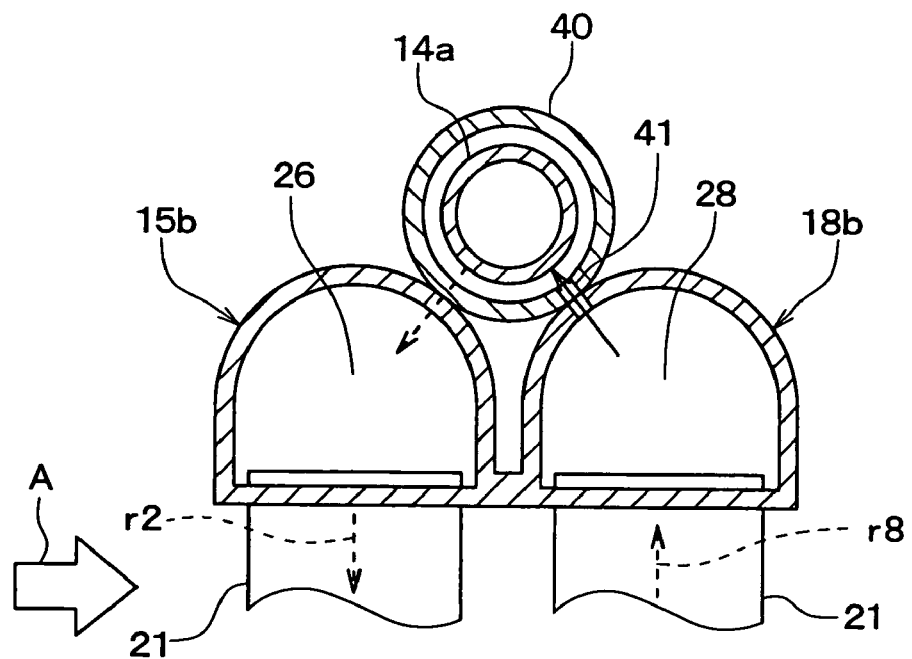
FIG. 7 is a cross-sectional view showing a tank portion in an evaporator unit according to a third embodiment of the present invention.

Then, as shown in FIG. 7, the refrigerant collected to the left space 28 of the upper header tank 18b flows into the separate tank 40 via the communication hole 41, and is drawn into the mixing portion 14c of the ejector 14 from the suction port 14b of the ejector 14 via the suction refrigerant passage 42.

In the third embodiment, because the nozzle portion 14a of the ejector 14 is brazed integrally with the separate tank 40, the forming work for forming the evaporator unit can be made simple as compared with a case where the nozzle portion 14a is assembled to the separate tank 40 after the brazing of the separate tank 40.

Furthermore, because the nozzle portion 14a is brazed on its outer peripheral surface to the separate tank 40, it can prevent a melted brazing material from flowing into the very small passage of the nozzle portion 14a, thereby preventing the very small passage of the nozzle portion 14a from being closed.

Furthermore, because the brazing position of the nozzle portion 14a is set at the position except for the suction refrigerant passage 42, it can prevent the melted brazing material from flowing into the suction refrigerant passage 42. Therefore, the suction refrigerant passage 42 is not narrowed or closed by the melted brazing material.

In the third embodiment, the other parts of the evaporator unit 20 including the separate tank 40 may be similar to those of the above-described first embodiment.

Fourth Embodiment

Figure 9:
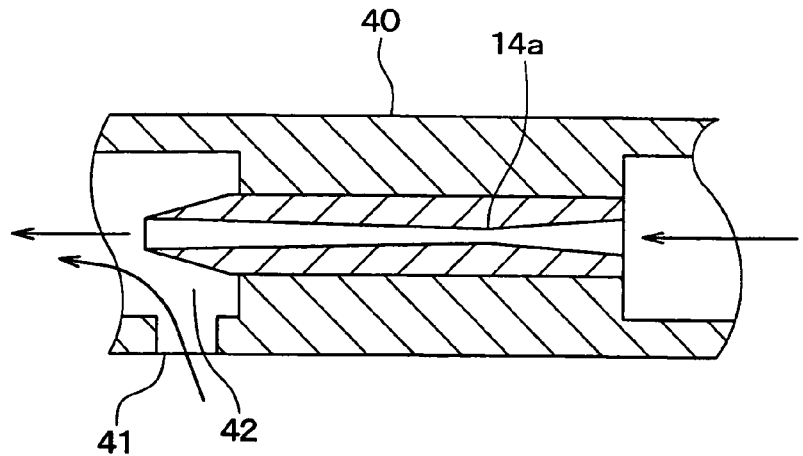
FIG. 9 is a cross-sectional view showing a separate tank according to a fourth embodiment of the present invention.

A fourth embodiment of the present invention will be now described with reference to FIG. 9. The fourth embodiment is a modification of the above-described third embodiment.

In the above-described third embodiment of the present invention, the inner diameter of the cylindrical separate tank 40 is made constant. However, in the fourth embodiment, as shown in FIG. 9, the inner diameter of the separate tank 40 at a brazing portion, to which the nozzle portion 14a is brazed, is made smaller than the inner diameter of the separate tank 40 at the remaining portion other than the brazing portion.

According to the fourth embodiment, the passage sectional area of the suction refrigerant passage 42 can be made larger than that of the third embodiment, and thereby the refrigerant can be smoothly drawn into the mixing portion 14c from the refrigerant suction port 14b of the ejector 14 via the suction refrigerant passage 42.

In the fourth embodiment, the other pasts of the evaporator unit may be similar to those of the above-described third embodiment.

Fifth Embodiment

A fifth embodiment of the present invention will be now described with reference to FIG. 10. The fifth embodiment is another modification of the above-described third embodiment.

In the above-described fourth embodiment, the inner diameter of the separate tank 40 is made smaller in a relative wide range so that the outer peripheral surface of the nozzle portion 14a can be brazed to the separate tank 40 in the relatively wide range. However, in the fifth embodiment, the inner diameter of the separate tank 40 is reduced partially in a small area, so that the nozzle portion 14a can be brazed in a small part relative to the separate tank 40.

According to the fifth embodiment of the present invention, it can reduce a deformation of the very small passage (fine passage) within the nozzle portion 14a, due to a thermal contraction, as compared with the fourth embodiment. Accordingly, the arrangement position of the communication hole 41 can be easily set as compared with the above-described fourth embodiment.

Figure 10:
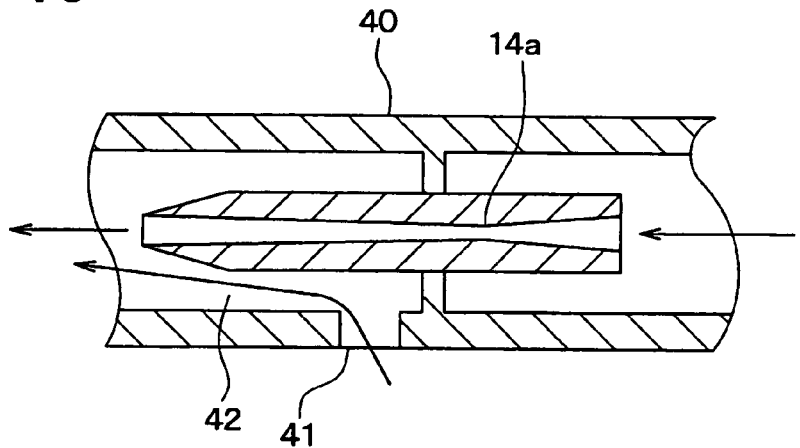
FIG. 10 is a cross-sectional view showing a separate tank according to a fifth embodiment of the present invention.

In the example of FIG. 10, the inner diameter of the separate tank 40 is reduced at one position in the longitudinal direction of the separate tank 40. However, the inner diameter of the separate tank 40 may be reduced partially at plural positions such that the nozzle portion 14a can be brazed to the separate tank 40 at the plural positions.

In the fifth embodiment, the other parts of the integrated unit may be similar to those of the above-described third embodiment.

Sixth Embodiment

A sixth embodiment of the present invention will be now described with reference to FIGS. 11A and 11B. The sixth embodiment is another modification of the above-described third embodiment.

In the above-described fifth embodiment, the inner diameter of the separate tank 40 is partially reduced. However, in the sixth embodiment, as shown in FIGS. 11A and 11B, the inner diameter of the separate tank 40 is made constant, and an interposition member 43 is located at a portion between the outer peripheral surface of the nozzle portion 14a and the inner wall surface of the separate tank 40.

The interposition member 43 is made of metal such as aluminum having a sufficient brazing property, and is brazed integrally with the nozzle portion 14a. In the present embodiment, the interposition member 43 is a circular plate having a hole at its center area. The nozzle portion 14a is fitted into the hole of the interposition member 43 and is brazed integrally with the interposition member 43.

The interposition member 43 can be fixed into the separate tank 40 by fitting or using a fastening member, without being limited to a brazing. When the interposition member 43 is fixed by fastening, a protrusion portion for the fastening may be provided on the interposition member 43. Thus, in the sixth embodiment, the effects and advantages described in the fifth embodiment can be obtained.

Figure 11A:
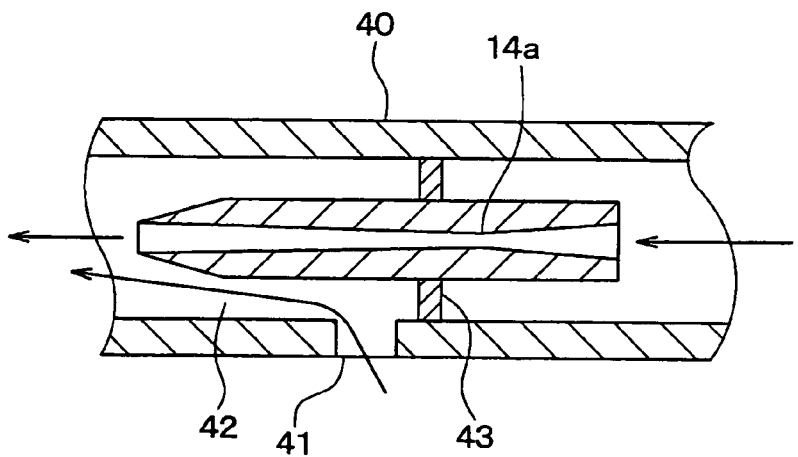
FIG. 11A is a cross-sectional view showing a separate tank according to a sixth embodiment of the present invention.
Figure 11B:
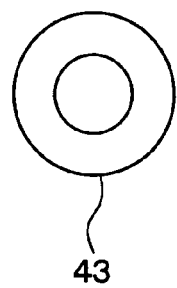
FIG. 11B is a front view showing an interposition member in the separate tank of FIG. 11A.

In the example of FIGS. 11A and 11B, the interposition member 43 may be arranged at a single position. However, a plurality of the interposition members 43 may be located at plural positions in the longitudinal direction of the nozzle portion 14a.

In the sixth embodiment, the other parts of the evaporator unit may be similar to those of the above-described third embodiment.

Seventh Embodiment

A seventh embodiment of the present invention will be now described with reference to FIG. 12. The seventh embodiment is another modification of the above-described third embodiment.

In the above-described fifth embodiment, the inner diameter of the separate tank 40 is partially reduced while the outer diameter of the nozzle portion 14a except for the taper-shaped tip portion is made substantially constant. However, in the seventh embodiment, the outer diameter of the nozzle portion 14a except for the taper-shaped tip portion is partially increased while the inner diameter of the separate tank 40 is made constant. Accordingly, in the seventh embodiment, the advantages and effects described in the fifth embodiment can be obtained.

Figure 12:
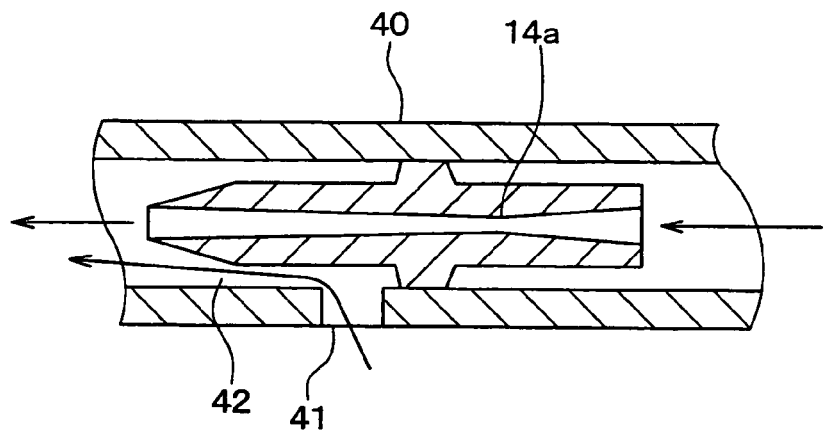
FIG. 12 is a cross-sectional view showing a separate tank according to a seventh embodiment of the present invention.

In the example of FIG. 12, the outer diameter of the nozzle portion 14a is enlarged radially at a single position except for the taper-shaped tip portion, relative to the separate tank 40, in the longitudinal direction of the nozzle portion 14a. However, the outer diameter of the nozzle portion 14a can be enlarged radially at plural positions except for the taper-shaped tip portion, relative to the separate tank 40, in the longitudinal direction of the nozzle portion 14a.

In the seventh embodiment, the other parts of the evaporator unit may be similar to those of the above-described third embodiment.

Eighth Embodiment

Figure 13:
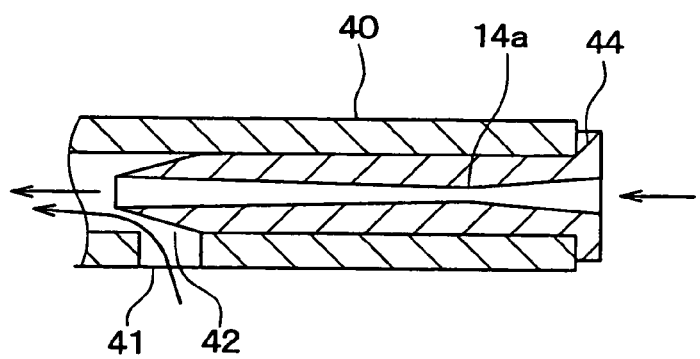
FIG. 13 is a cross-sectional view showing a separate tank according to an eighth embodiment of the present invention.

An eighth embodiment of the present invention will be now described with reference to FIG. 13. The eighth embodiment is another modification of the above-described third embodiment.

In the above-described third embodiment, all the nozzle portion 14a is located within the separate tank 40. However, in the eighth embodiment, as shown in FIG. 13, the inlet-side end portion (e.g., the right end portion in FIG. 13) of the nozzle portion 14a is located to slightly protrude outside from the separate tank 40. The protruding end portion of the nozzle portion 14a is configured to have a flange portion 44 protruding radially outwardly from the inner wall surface of the separate tank 40.

Thus, in the present embodiment, the outer peripheral surface of the nozzle portion 14a except for the taper-shaped tip portion is brazed to the inner wall surface of the separate tank 40, and the flange portion 44 of the nozzle portion 14a can contact the end surface of the separate tank 40 to be brazed to the end surface of the separate tank 40.

According to the eighth embodiment of the present invention, the flange portion 44 provided in the end portion of the nozzle portion 14a is made to contact the end surface of the separate tank 40, and thereby the longitudinal position of the nozzle portion 14a relative to the separate tank 40 can be regulated. Thus, the arrangement position of the nozzle portion 14a can be easily and accurately set in the separate tank 40.

In the eighth embodiment, the other parts of the evaporator unit may be similar to those of the above-described third embodiment.

Ninth Embodiment

Figure 14:
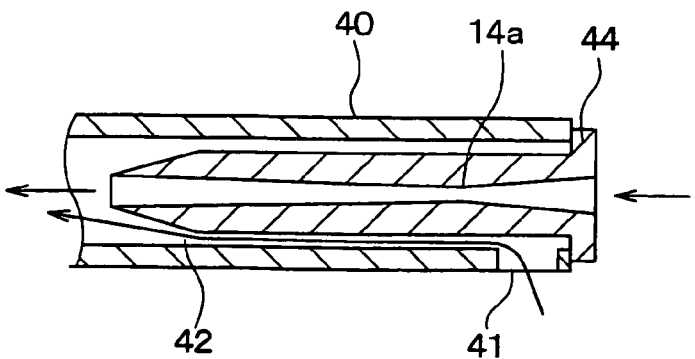
FIG. 14 is a cross-sectional view showing a separate tank according to a ninth embodiment of the present invention.

A ninth embodiment of the present invention will be described with reference to FIG. 14. The ninth embodiment is another modification of the above-described third embodiment. In the above-described eighth embodiment, both the outer peripheral surface and the flange portion 44 of the nozzle portion 14a are brazed to the separate tank 40. However, in the ninth embodiment, as shown in FIG. 14, a predetermined clearance is formed between the outer peripheral surface of the nozzle portion 14a and the inner wall surface of the separate tank 40, and only the flange portion 44 of the nozzle portion 14a is brazed to the separate tank 40.

According to the ninth embodiment, because the clearance is formed between the outer peripheral surface of the nozzle portion 14a and the inner wall surface of the separate tank 40, the communication hole 41 can be easily provided in the separate tank 40.

However, in the ninth embodiment, the outer peripheral surface of the nozzle portion 14a may partially protrude radially outside to be partially brazed to the inner wall surface of the separate tank 40.

In the ninth embodiment, the other parts of the evaporator unit may be similar to those of the above-described third embodiment.

Tenth Embodiment

Figure 15:
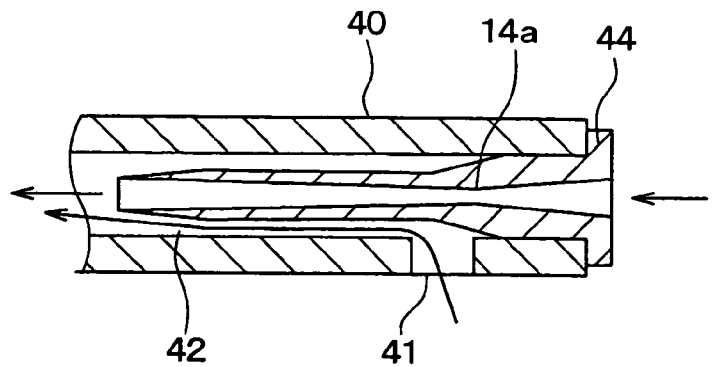
FIG. 15 is a cross-sectional view showing a separate tank according to a tenth embodiment of the present invention.

A tenth embodiment of the present invention will be described with reference to FIG. 15. The tenth embodiment is another modification of the above-described third embodiment. In the above-described ninth embodiment, only the flange portion 44 of the nozzle portion 14a is brazed to the separate tank 40. However, in the tenth embodiment, as shown in FIG. 15, the outer diameter of a part of the nozzle portion 14a adjacent to the flange portion 44 is made larger so that the flange portion 44 and the portion adjacent to the flange portion 44 of the nozzle 14a are brazed to the separate tank 40.

In the tenth embodiment, the brazing area between the nozzle portion 14a and the separate tank 40 can be made larger, thereby accurately brazing the nozzle portion 14a to the separate tank 40.

In the tenth embodiment, the other parts of the evaporator unit may be similar to those of the above-described third embodiment.

Eleventh Embodiment

An eleventh embodiment of the present invention will be described with reference to FIG. 16. The eleventh embodiment is another modification of the above-described third embodiment. In the above-described third embodiment, at least one of the nozzle portion 14a and the separate tank 40 are formed by a clad material so that the nozzle portion 14a and the separate tank 40 are integrally brazed. However, in the eleventh embodiment, both the nozzle portion 14a and the separate tank 40 are not formed by a clad material with a brazing material, but both the nozzle portion 14a and the separate tank 40 are integrally brazed by using a separate brazing material 45.

Figure 16:
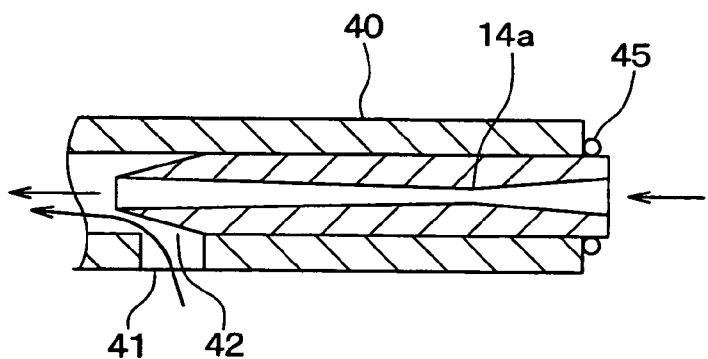
FIG. 16 is a cross-sectional view showing a separate tank according to an eleventh embodiment of the present invention.

For example, the inlet-side end portion of the nozzle portion 14a slightly protrudes from an end surface of the separate tank 40, and a brazing material 45 is arranged in a corner wall portion between the protruding end portion of the nozzle portion 14a and the end surface of the separate tank 40, as shown in FIG. 16. In the example of FIG. 16, the brazing material 45 is formed into a ring shape to be arranged along the entire periphery of the corner portion between the protruding end portion of the nozzle portion 14a and the end surface of the separate tank 40. However, the brazing material 45 may be arranged only a part of the corner portion in the circumferential direction.

In the eleventh embodiment, the nozzle portion 14a and the separate tank 40 are brazed at the corner wall portion by using the brazing material 45 located at the corner wall portion. In addition, the brazing material 45 melted in the brazing flows into a clearance between the outer peripheral surface of the nozzle portion 14a and the inner wall surface of the separate tank 40 by capillary phenomenon so as to braze the outer peripheral surface of the nozzle portion 14a and the inner wall surface of the separate tank 40 to each other. Accordingly, in the eleventh embodiment, the effects described in the third embodiment can be also obtained.

Twelfth Embodiment

Figure 17:
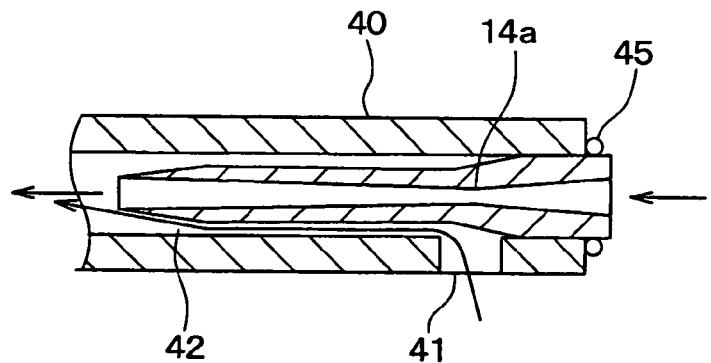
FIG. 17 is a cross-sectional view showing a separate tank according to a twelfth embodiment of the present invention.

A twelfth embodiment of the present invention will be described with reference to FIG. 17. The twelfth embodiment is another modification of the above-described third embodiment.

In the above-described eleventh embodiment of the present invention, the outer diameter of the portion of the nozzle portion 14a except for the taper-shaped tip portion on the refrigerant outlet side is made constant. However, in the twelfth embodiment, as shown in FIG. 17, the outer diameter of an upstream portion of the nozzle portion 14a upstream from the communication hole 41 in a refrigerant flow is made larger so that the upstream portion of the nozzle portion 14a is brazed to the inner wall surface of the separate tank 40.

According to the twelfth embodiment, because the clearance is formed between the outer peripheral surface of the nozzle portion 14a and the inner wall surface of the separate tank 40 on a relatively upstream side in the refrigerant flow, the communication hole 41 can be easily provided in the separate tank 40.

In the twelfth embodiment, the other parts of the evaporator unit may be similar to those of the above-described third embodiment.

Thirteenth Embodiment

A thirteenth embodiment of the present invention will be described with reference to FIGS. 18 and 19. The thirteenth embodiment is another modification of the above-described third embodiment.

In the above-described eleventh embodiment, the inlet-side end portion of the nozzle portion 14a is arranged to slightly protrude from the end surface of the separate tank 40, and the brazing material 45 is located in the corner wall portion between the inlet-side end portion of the nozzle portion 14a and the end surface of the separate tank 40. However, in the thirteenth embodiment, as shown in FIG. 18, all the nozzle portion 14a is arranged within the separate tank 40, and a recess portion 46 is provided on the outer peripheral surface of the nozzle portion 14a. Furthermore, a brazing material 45 is arranged in the recess portion 46 between the outer peripheral surface of the nozzle portion 14a and the inner wall surface of the separate tank 40.

Figure 18:
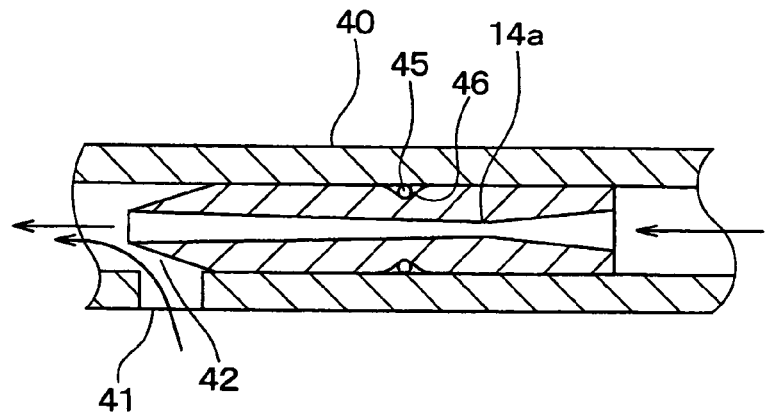
FIG. 18 is a cross-sectional view showing a separate tank according to a thirteenth embodiment of the present invention.

In the example of FIG. 18, the brazing material 45 and the recess portion 46 are formed into ring shapes. However, the brazing material 45 and the recess portion 46 may be formed into other shapes without being limited to the ring shapes. For example, the brazing material 45 and the recess portion 46 may be formed partially in the circular direction. In the example of FIG. 18, the recess portion 46 may be formed by plastic processing, or may be formed by cutting.

In the thirteenth embodiment of the present invention, the nozzle portion 14a and the separate tank 40 are brazed at the recess portion 46 by using the brazing material 45. In addition, the brazing material 45 melted in the brazing flows into a clearance between the outer peripheral surface of the nozzle portion 14a and the inner wall surface of the separate tank 40 by capillary phenomenon so as to braze the outer peripheral surface of the nozzle portion 14a and the inner wall surface of the separate tank 40 to each other. Accordingly, in the eleventh embodiment, the effects described in the third embodiment can be also obtained.

Figure 19:
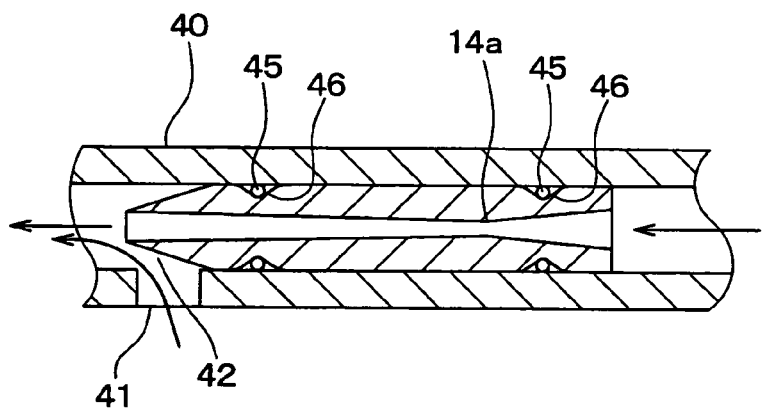
FIG. 19 is a cross-sectional view showing a separate tank according to a modification of the thirteenth embodiment of the present invention.

FIG. 19 is a modification of the above-described thirteenth embodiment. In the example of FIG. 19, the brazing material 45 and the recess portion 46 can be located at plural positions in the longitudinal direction of the nozzle portion 14a. In the examples of FIGS. 18 and 19, the recess portion 46 is provided on the outer peripheral surface of the nozzle portion 14a so that the brazing material 45 is arranged in the recess portion 46 between the nozzle portion 14a and the separate tank 40. However, the recess portion 46 may be provided on the inner wall surface of the separate tank 40 so that the brazing material 45 is arranged in the recess portion 46 between the nozzle portion 14a and the separate tank 40.

In the thirteenth embodiment, the other parts of the evaporator unit may be similar to those of the above-described third embodiment.

Fourteenth Embodiment

Figure 20:
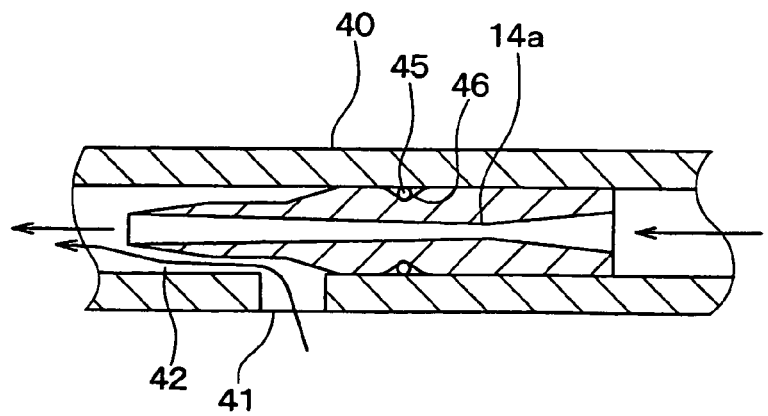
FIG. 20 is a cross-sectional view showing a separate tank according to a fourteenth embodiment of the present invention.

A fourteenth embodiment of the present invention will be described with reference to FIG. 20. The fourteenth embodiment is another modification of the above-described third embodiment.

In the above-described thirteenth embodiment, the portion except for the tip portion of the nozzle portion 14a on its refrigerant outlet side is formed to have a constant outer diameter. However, in the fourteenth embodiment, as shown in FIG. 20, the outer diameter of an upstream portion of the nozzle portion 14a upstream from the communication hole 41 in the refrigerant flow is partially enlarged to be brazed to the inner wall surface of the separate tank 40. In this case, the arrangement position of the communication hole 41 can be easily set in the longitudinal direction of the separate tank 40. Even in this case, the brazing material 45 and the recess portion 46 can be provided between the outer peripheral surface of the nozzle portion 14a and the inner wall surface of the separate tank 40, as shown in FIG. 20. Furthermore, as shown in FIG. 20, the outer diameter of the downstream end portion of the nozzle portion 14a may be reduced gradually or in irregular, without being limited to the taper shape.

Other Embodiments

It should be understood that the present invention is not limited to the above-mentioned embodiments, and various modifications can be made to the present embodiments as follows.

In the above-described first and second embodiments, the throttle 17 is configured by using the hole 32a of the nozzle inlet pipe 32. However, the throttle 17 may be configured by using a capillary tube. In this case, the hole 32a may be omitted in the nozzle inlet pipe 32, and the branch portion Z and the branch passage 16 are provided in the connection block 29. Furthermore, the capillary tube may be arranged in the upper header tank 18b of the second evaporator 18 to be parallel with the nozzle inlet pipe 32, such that one end portion of the capillary tube communicates with the branch passage 16, and the other end portion of the capillary tube is directly open to the right space 27 of the upper header tank 18b.

Accordingly, the refrigerant branched at the branch portion Z in the connection block 29 can be decompressed in the capillary tube used as the throttle, and thereafter can flows into the right space 27 of the upper header tank 18b.

In the above-described embodiments, the first evaporator 15, the second evaporator 18 and the ejector 14 are integrally constructed as the evaporator unit 20. However, the other components may be integrated in the evaporator unit 20.

For example, the thermal expansion valve 13 and the temperature sensing portion 13a may be also integrated in the evaporator unit 20.

In the above-described embodiments, the first evaporator 15 and the second evaporator 18 are arranged adjacent to each other to be integrally constructed in the evaporator unit 20. However, the structure of the evaporator unit 20 is not limited to the structure shown in FIG. 2, and may be suitably changed.

For example, the first evaporator 15 and the second evaporator 18 may be arranged to be spaced from each other by a predetermined distance, and a refrigerant pipe may be located such that the inner spaces of the upper header tanks 15b, 18b of the first and second evaporators 15, 18 communicate with each other via the refrigerant pipe.

Although in the above-described embodiments, the vapor-compression subcritical refrigerant cycle has been described in which the refrigerant is a flon-based one, an HC-based one, or the like, whose high pressure does not exceed the critical pressure of the refrigerant, the present invention may be applied to a vapor-compression supercritical refrigerant cycle which employs the refrigerant, such as carbon dioxide ($CO_2$), whose high pressure exceeds the critical pressure of the refrigerant.

In the supercritical refrigerant cycle, only the refrigerant discharged by the compressor 11 dissipates heat in the supercritical state at the radiator 12, and hence is not condensed. Thus, the liquid receiver 12a disposed on the high-pressure side cannot exhibit a liquid-vapor separation effect of the refrigerant, and a retention effect of the excessive liquid refrigerant. The supercritical cycle may have the structure including an accumulator at the outlet of the first evaporator 15. In this case, the accumulator is used as a low-pressure gas-liquid separator.

In the above supercritical refrigerant cycle, the branch portion Z upstream of the nozzle portion 14a of the ejector 14 may be omitted. In this case, a downstream side of the thermal expansion valve 13 is connected to the nozzle portion 14a of the ejector 14, and liquid refrigerant separated at the accumulator is made to flow into the heat exchange core 18a of the second evaporator 18.

Although in the above-mentioned embodiments, the ejector 14 is a fixed ejector having the nozzle portion 14a with the certain path area, the ejector 14 for use may be a variable ejector having a variable nozzle portion whose path area is adjustable.

For example, the variable nozzle portion may be a mechanism which is designed to adjust the path area by controlling the position of a needle inserted into a passage of the variable nozzle portion using the electric actuator.

Although in the above-described first embodiment, the evaporator unit 20 is used as an interior heat exchanger, and the radiator 12 is used as the exterior heat exchanger. However, the evaporator unit 20 may be used as an exterior unit configured to absorb heat from outside air as a heat source, and the radiator 12 may be used as an interior heat exchanger for heating a fluid such as water or air, in a heat pump cycle.

In the above-described embodiments, the refrigerant cycle device having the evaporator unit 20 is used for a vehicle.

However, the refrigerant cycle device having the evaporator unit 20 may be used for a fixed room without being limited to the vehicle.

Any two of the above-described embodiments may be suitably combined without being limited to the example shown in each embodiment.

In the above-described third to fourteenth embodiments, the ejector 40 is located inside the separate tank 40. However, the ejector 14 according to any one of the third to fourteenth embodiments may be located inside the upper header tank 18b of the second evaporator 18. In this case, the upper header tank 18b may be configured to have the structure of the separate tank 40 in the integrated unit 20.

In the above-described embodiments, the thermal expansion valve 13 is used in the refrigerant cycle device 10. However, thermal expansion valve 13 may be omitted, and a mechanical expansion valve or an electrical expansion valve may be used instead of the thermal expansion valve 13.

In the above-described first embodiment, the tanks 15b, 15c, 18b, and 18c of the first evaporator 15 and the second evaporator 18 are disposed on both the upper and lower sides of the first and second evaporators 15, 18, that is, the first evaporator 15 and the second evaporator 18 are disposed vertically. Alternatively, the first evaporator 15 and the second evaporator 18 may be disposed in a slanted manner with respect to the vertical direction. Furthermore, the first evaporator 15 and the second evaporator 18 may be located to cool different spaces without being limited to the common space.

Furthermore, in the above described embodiments, the ejector 14 may be located in the header tank 15b of the first evaporator 15 connected to the refrigerant suction side of the ejector 14 or the header tank 18b of the second evaporator 18 connected to the refrigerant outlet of the ejector 14 in the evaporator unit 20. That is, the second evaporator 18 with the ejector 14 described above may be used as an evaporator in the present invention.

According to an aspect of the present invention, an evaporator unit 20 includes an ejector 14 and an evaporator (18). The ejector 14 has a nozzle portion 14a which decompresses refrigerant, and a refrigerant suction port 14b from which refrigerant is drawn by a high-speed refrigerant flow jetted from the nozzle portion 14a. The refrigerant jetted from the nozzle portion 14a and the refrigerant drawn from the refrigerant suction port 14b are mixed in the ejector 14 and discharged from an outlet of the ejector 14. The evaporator (18) is connected to the ejector 14 to evaporate the refrigerant to be drawn into the refrigerant suction port 14b or the refrigerant flowing out of the outlet of the ejector 14. Furthermore, the evaporator 18 includes a plurality of tubes 21 in which the refrigerant flows, and a tank (18b, 40) configured to distribute the refrigerant into the tubes 21 or to collect the refrigerant from the tubes 21. The ejector 14 is located in the tank (18b, 40), and the nozzle portion 14a is brazed to the tank (18b, 40) to be fixed into the tank (18b, 40). Accordingly, the ejector 14 including the nozzle portion 14a can be brazed integrally with the tank (18b, 40), thereby improving the productivity of an evaporator unit while reducing the manufacturing cost of the evaporator unit.

The tank (18b, 40) may be a header tank such as the upper header tank 18b directly connected to the tubes 21 or may be a separate tank 40 separated from the header tank.

Such changes and modifications are to be understood as being within the scope of the present invention as defined by the appended claims.

What is claimed is:

1. An evaporator unit comprising:
    an ejector that has a nozzle portion configured to decompress refrigerant, and a refrigerant suction port from which refrigerant is drawn by a high-speed refrigerant flow jetted from the nozzle portion, wherein the refrigerant jetted from the nozzle portion and the refrigerant drawn from the refrigerant suction port are mixed and discharged from an outlet of the ejector; and
    an evaporator connected to the ejector to evaporate the refrigerant to be drawn into the refrigerant suction port or the refrigerant flowing out of the outlet of the ejector, wherein
    the evaporator includes a plurality of tubes in which the refrigerant flows, and a tank configured to distribute the refrigerant into the tubes or to collect the refrigerant from the tubes,
    the ejector is located in the tank,
    the nozzle portion is brazed to the tank to be fixed into the tank, and
    a nozzle support portion located in the tank, and protruding from an inner wall surface of the tank to an outer peripheral surface of the nozzle portion to support the nozzle portion, wherein the nozzle portion and the nozzle support portion are brazed to be fixed to each other at a brazing portion between the nozzle portion and the nozzle support portion.

2. The evaporator unit according to claim 1, wherein a part of the nozzle portion is brazed to the tank.

3. The evaporator unit according to claim 1, wherein
    the nozzle portion has a cylindrical shape having an outer peripheral surface, and
    the nozzle portion is brazed to the tank at least on a part of the outer peripheral surface.

4. The evaporator unit according to claim 3, further comprising
    a suction refrigerant passage, provided at a radial outside of the nozzle portion, through which the refrigerant drawn from the refrigerant suction port flows,
    wherein the outer peripheral surface of the nozzle portion is brazed to the tank at a portion except for the suction refrigerant passage.

5. The evaporator unit according to claim 1, wherein the nozzle portion is formed by a clad material on which a brazing material is covered.

6. The evaporator unit according to claim 1, wherein the tank is formed by a clad material on which a brazing material is covered.

7. The evaporator unit according to claim 1, wherein the nozzle portion has a temporal fixing portion configured to be temporally fixed to the tank.

8. The evaporator unit according to claim 2, wherein the nozzle portion is partially brazed to the tank at plural positions.

9. The evaporator unit according to claim 8, wherein the plural positions are positions of the nozzle portion, except for a refrigerant inlet and a refrigerant outlet of the nozzle portion.

10. The evaporator unit according to claim 9, wherein
    the tank is configured to extend in a tank longitudinal direction and to have therein first and second spaces partitioned from each other in the tank longitudinal direction,
    the first space of the tank is configured to distribute the refrigerant into the tubes,
    the second space of the tank is configured to collect the refrigerant from the tubes, and
    the refrigerant inlet of the nozzle portion is located in the first space, and the refrigerant outlet of the nozzle portion is located in the second space, the evaporator unit further comprising:
a refrigerant inlet provided at an end portion of the tank on a side of the first space in the tank longitudinal direction; and
a nozzle inlet pipe located in the first space of the tank, through which the refrigerant inlet of the nozzle portion communicates with the refrigerant inlet of the end portion of the tank, wherein one of the nozzle portion and the nozzle inlet pipe is inserted into the other one of the nozzle portion and the nozzle inlet pipe.

11. The evaporator unit according to claim 10, wherein
the nozzle portion is inserted into the nozzle inlet pipe to have an insertion portion, and
the insertion portion of the nozzle portion is brazed to an end portion of the nozzle inlet pipe.

12. The evaporator unit according to claim 1, wherein the refrigerant suction port is provided adjacent to a refrigerant outlet of the nozzle portion.

13. The evaporator unit according to claim 1, wherein a partition plate divides the tank into a first space and a second space, the nozzle portion having a first portion brazed to the partition plate and a second portion extending through the partition plate to open into the second space.

14. The evaporator unit according to claim 1, wherein:
a partition plate divides the tank into a first space and second space;
the nozzle portion extends through the first space to direct the decompressed refrigerant to the second space; and
the refrigerant suction port draws the refrigerant from the first space.

15. The evaporator unit according to claim 1, wherein the refrigerant drawn from by the refrigerant suction port is provided around an entire outside circumference of only a tip portion of the nozzle portion.

16. An evaporator unit comprising:
an ejector that has a nozzle portion configured to decompress refrigerant, and a refrigerant suction port from which refrigerant is drawn by a high-speed refrigerant flow jetted from the nozzle portion, wherein the refrigerant jetted from the nozzle portion and the refrigerant drawn from the refrigerant suction port are mixed and discharged from an outlet of the ejector; and
an evaporator connected to the ejector to evaporate the refrigerant to be drawn into the refrigerant suction port or the refrigerant flowing out of the outlet of the ejector, wherein
the evaporator has a plurality of tubes in which the refrigerant flows, and a tank extending in a tank longitudinal direction that is in parallel with a stacking direction of the tubes to distribute the refrigerant into the tubes or to collect the refrigerant from the tubes,
the tank is configured to have therein first and second spaces partitioned from each other in the tank longitudinal direction,
the first space of the tank is configured to distribute the refrigerant into the tubes,
the second space of the tank is configured to collect the refrigerant from the tubes,
the nozzle portion has a refrigerant inlet positioned in the first space, and a refrigerant outlet positioned in the second space,
the tank has a refrigerant inlet on a side of the first space in the tank longitudinal direction,
the refrigerant inlet of the nozzle portion communicates with the refrigerant inlet of the tank via a nozzle inlet pipe located in the first space of the tank, and
a nozzle support portion located in the tank, and protruding from an inner wall surface of the tank to an outer peripheral surface of the nozzle portion to support the nozzle portion, wherein the nozzle portion and the nozzle support portion are brazed to be fixed to each other at a brazing portion between the nozzle portion and the nozzle support portion.

17. The evaporator unit according to claim 16,
wherein one of the nozzle portion and the nozzle inlet pipe is inserted into the other one of the nozzle portion and the nozzle inlet pipe.

18. The evaporator unit according to claim 16,
wherein the nozzle inlet pipe has a hole from which a part of the refrigerant flowing into the nozzle inlet pipe from the refrigerant inlet flows into the first space.

19. The evaporator unit according to claim 18,
wherein a plurality of the holes are provided in the nozzle inlet pipe in the tank longitudinal direction.

20. The evaporator unit according to claim 18,
wherein the hole is provided to configure a throttle in which the refrigerant is decompressed.

21. The evaporator unit according to claim 16,
wherein the refrigerant suction port is provided along an entire outer periphery of the nozzle portion in a circumferential direction.

22. The evaporator unit according to claim 16, wherein the refrigerant suction port is provided in the second space.

23. The evaporator unit according to claim 16, wherein the refrigerant drawn from by the refrigerant suction port is provided around an entire outside circumference of only a tip portion of the nozzle portion.

24. An evaporator unit comprising:
an ejector that has a nozzle portion configured to decompress refrigerant, and a refrigerant suction port from which refrigerant is drawn by a high-speed refrigerant flow jetted from the nozzle portion, wherein the refrigerant jetted from the nozzle portion and the refrigerant drawn from the refrigerant suction port are mixed and discharged from an outlet of the ejector;
an evaporator connected to the ejector to evaporate the refrigerant to be drawn into the refrigerant suction port or the refrigerant flowing out of the outlet of the ejector;
a nozzle support portion located in the tank and protruding from an inner wall surface of the tank to an outer peripheral surface of the nozzle portion to Support the nozzle portion, wherein
the evaporator includes a plurality of tubes in which the refrigerant flows, and a tank configured to distribute the refrigerant into the tubes or to collect the refrigerant from the tubes,
the ejector is located in the tank,
the nozzle portion is brazed to the tank to be fixed into the tank; wherein
a part of the nozzle portion is brazed to the tank;
the nozzle portion is partially brazed to the tank at plurality positions;
the nozzle portion and the nozzle support portion are brazed to be fixed to each other, and
at least one of the plural positions is a brazing portion between the nozzle portion and the nozzle support portion.

* * * * *